United States Patent
Metzner et al.

(10) Patent No.: US 9,417,983 B2
(45) Date of Patent: Aug. 16, 2016

(54) OVER-CURRENT DETECTION FOR BUS LINE DRIVERS

(71) Applicant: Infineon Technologies AG, Neubiberg (DE)

(72) Inventors: Dieter Metzner, Eichenau (DE); Peter Widerin, Horbranz (DE); Paul Wallner, Prien (DE); Thomas Rickes, Hohenkirchen-S (DE)

(73) Assignee: Infineon Technologies AG, Neubiberg (DE)

( * ) Notice: Subject to any disclaimer, the term of this patent is extended or adjusted under 35 U.S.C. 154(b) by 370 days.

(21) Appl. No.: 13/908,702

(22) Filed: Jun. 3, 2013

(65) Prior Publication Data

US 2014/0359190 A1 Dec. 4, 2014

(51) Int. Cl.
| | |
|---|---|
| *G06F 13/36* | (2006.01) |
| *H02H 7/09* | (2006.01) |
| *H02H 3/00* | (2006.01) |
| *H02H 9/08* | (2006.01) |
| *G06F 11/30* | (2006.01) |
| *G06F 13/40* | (2006.01) |

(52) U.S. Cl.
CPC ........ *G06F 11/3027* (2013.01); *G06F 13/4027* (2013.01); *G06F 13/4072* (2013.01)

(58) Field of Classification Search
CPC ....... H02H 3/08; H02H 9/025; G01R 31/024; H02P 29/027; H02P 29/021; H02P 3/22; H02P 8/36; H02J 2007/0039
USPC ............... 710/306; 318/400.22; 361/87, 93.9; 363/132
See application file for complete search history.

(56) References Cited

U.S. PATENT DOCUMENTS

| | | | | |
|---|---|---|---|---|
| 4,782,300 A * | 11/1988 | Bonaccio et al. | ............. | 324/509 |
| 4,783,714 A * | 11/1988 | Kalina | ................... | H02H 3/087 |
| | | | | 361/101 |
| 5,487,013 A * | 1/1996 | Luber | ........................... | 700/293 |
| 5,696,777 A * | 12/1997 | Hofsaess | ....................... | 714/820 |
| 5,864,456 A * | 1/1999 | Connor | ............ | G05B 19/0425 |
| | | | | 327/380 |
| 6,144,904 A | 11/2000 | Tseng | | |
| 6,329,856 B1 * | 12/2001 | Tabler | ................ | G01R 31/3004 |
| | | | | 323/266 |
| 6,661,631 B1 | 12/2003 | Meador et al. | | |
| 7,554,409 B1 * | 6/2009 | Zhang | ..................... | H03F 1/523 |
| | | | | 330/10 |
| 7,667,939 B2 | 2/2010 | Kiuchi | | |
| 7,835,124 B2 | 11/2010 | Siddhartha et al. | | |
| 8,295,022 B2 * | 10/2012 | Tang et al. | ................... | 361/93.9 |
| 9,172,235 B2 * | 10/2015 | Metzner | ............. | H04L 25/0272 |
| 2003/0112570 A1 * | 6/2003 | Koida | ........................... | 361/93.9 |

(Continued)

OTHER PUBLICATIONS

Notice of Allowance from U.S. Appl. No. 13/908,770, mailed May 15, 2015, 9 pp.

*Primary Examiner* — Faisal M Zaman
(74) *Attorney, Agent, or Firm* — Shumaker & Sieffert, P.A.

(57) ABSTRACT

An electrical circuit for driving a bus is described that includes at least one branch coupled to at least one signal line at a termination of the bus and a transmit data input configured to receive data that the electrical circuit drives across the bus. The electrical circuit also includes a current detection unit coupled to the at least one branch, which is configured to detect a current through the at least one branch. The electrical circuit also includes an over-current determination unit coupled to both the current detection unit and the transmit data input. The over-current determination unit is configured to determine an over-current condition at the at least one branch based on the current at the at least one branch and the data at the transmit data input.

16 Claims, 25 Drawing Sheets

(56) References Cited

U.S. PATENT DOCUMENTS

| | | | |
|---|---|---|---|
| 2006/0285371 A1* | 12/2006 | Kim | H02H 9/025 363/55 |
| 2008/0158757 A1 | 7/2008 | G.K. et al. | |
| 2009/0009920 A1 | 1/2009 | Yamada | |
| 2009/0034302 A1* | 2/2009 | Cannella | H02M 1/32 363/56.1 |
| 2010/0301809 A1* | 12/2010 | Bhade | B60L 11/1824 320/148 |
| 2011/0031889 A1* | 2/2011 | Shim | H05B 33/0812 315/158 |
| 2012/0320478 A1 | 12/2012 | Gosse | |
| 2013/0021701 A1* | 1/2013 | Yin et al. | 361/79 |
| 2013/0063188 A1* | 3/2013 | Sogo et al. | 327/109 |
| 2013/0128396 A1* | 5/2013 | Danesh | G01R 19/00 361/45 |

* cited by examiner

OVER-CURRENT DETECTION FOR BUS LINE DRIVERS

TECHNICAL FIELD

This disclosure relates to bus line drivers, and more particular, to techniques for handling over-current conditions at a bus.

BACKGROUND

Some systems may include multiple nodes that communicate data between one another between different parts of the system. In some systems (e.g., vehicle systems), each node may be, for example, an electrical control unit (ECU) that controls a specific part of the system. For example, one node may control a specific part of a system (such as a wheel braking system) and may rely on a sensor measurement taken at a different node that controls a different part of the system (e.g., a brake pedal control system). Nodes may communicate data between one another by driving (i.e., transmitting and receiving) data across a communication bus. In some systems, rather than include a dedicated communication bus between two communicating nodes, multiple nodes in the system may communicate with one another via a single shared communication bus (e.g., a single communication bus that is shared by multiple nodes in the system). For example, a wheel braking system may communicate with a brake pedal control system across the same communication bus used by a cooling system to communicate with an engine propulsion system even though the wheel braking and brake pedal control systems rarely or never communicate directly with the cooling and/or the engine propulsion systems.

In some systems, nodes may communicate across a single shared bus according to a message-based protocol, such as a Controller Area Network (CAN) protocol, a FlexRay™ protocol, an Ethernet protocol or another type of message-based communication protocol. Message-based protocols may minimize and even prevent data communication between two nodes from interfering with the data communication between two different nodes. Message-based protocols may eliminate the need for a central (e.g., host) computer to manage communication data on the bus by instead relying on timing (e.g., controlling when a particular node can communicate on the bus) and/or message identifiers (e.g., headers within the data that identify the sender and recipient of a data communication) defined by the protocol.

Message-based protocols may define communication between nodes using low voltage differential signals. Two or more nodes may communicate data between each other by transmitting and receiving differential signals across the bus. The polarity of a low voltage differential signal at a given time may define the logic value (e.g., a one or zero for binary data) of the data being transmitted. For example, a transmitting node may include a bus driver that drives a low voltage differential signal (e.g., as the difference between two voltage signals) across one or more signal lines of the bus. The bus driver of a receiving node may receive the two voltage signals from the one or more signal lines of the bus and determine, based on the difference in voltage between the two signals, a single low voltage differential signal. Based on the polarity of the low voltage differential signal, the receiving node may determine the data being transmitted being transmitted across the bus.

While a single shared communication may offer the advantage of limiting the number of electrical connections (e.g., wires) used to communicate data between nodes of a system, a single communication bus may have some disadvantages. For example, by way of physically connecting to the bus, each node connected to the bus is electrically coupled (i.e., connected) to every other node connected to the bus. As such, each node on the bus inherently shares an electrical connection with every other node connected to the bus and may be susceptible to over-current conditions caused by every other node on the bus. In other words, a single node on the bus could cause an over-current condition (e.g., by way of a short circuit, incorrect design, excessive load, or another factor) on the bus that either damages or otherwise causes other nodes connected to the bus to malfunction. In addition, the wire harness that holds the bus may cause an over-current condition at the bus that has the potential to damage the nodes connected to the bus. For instance, an over-current condition may arise on a bus when a bus wire of a wire harness inadvertently comes in contact with other electrical wires or metal parts of a supporting mechanical structure due to vibrations, collisions, and/or failures of the supporting mechanical structure.

SUMMARY

In general, techniques and circuits are described to determine, with a bus driver, an over-current condition at a signal line of an electrical bus. Over-current determinations are made by the bus driver in order to detect high current situations at the signal line that have potential to cause damage or otherwise interfere with the operations of a node connected to the bus. The techniques and circuits are further described to determine specific over-current conditions depending on the data being transmitted by the bus driver. In addition, the techniques and circuits are further described to use precise timing constraints to restrict over-current determinations to occur subsequent to and in synch with a change in the data being driven.

In one example, the disclosure is directed to an electrical circuit for driving a bus, including at least one branch coupled to at least one signal line at a termination of the bus, a transmit data input configured to receive data that the electrical circuit drives across the bus, and a current detection unit coupled to the at least one branch. The current detection unit is configured to detect a current through the at least one branch. The electrical circuit further includes an over-current determination unit coupled to both the current detection unit and the transmit data input. The over-current determination unit is configured to determine an over-current condition at the at least one branch based on the current at the at least one branch and the data at the transmit data input.

In one example, the disclosure is directed to a method including detecting a current through at least one branch of a driver unit coupled to a bus for driving at least one signal line of the bus. The method further includes detecting a change in data at a transmit data input of the driver unit. The method further includes determining an over-current condition at the at least one branch based at least in part on the detected current and in response to the change.

In one example, the disclosure is directed to a device having means for detecting a current through at least one branch of a driver unit coupled to a bus for driving at least one signal line of the bus. The device further having means for detecting a change in data at a transmit data input of the driver unit, and having means for determining an over-current condition at the at least one branch based at least in part on the detected current and in response to the change.

The details of one or more examples are set forth in the accompanying drawings and the description below. Other features, objects, and advantages of the disclosure will be apparent from the description and drawings, and from the claims.

DETAILED DESCRIPTION

Figure 1:
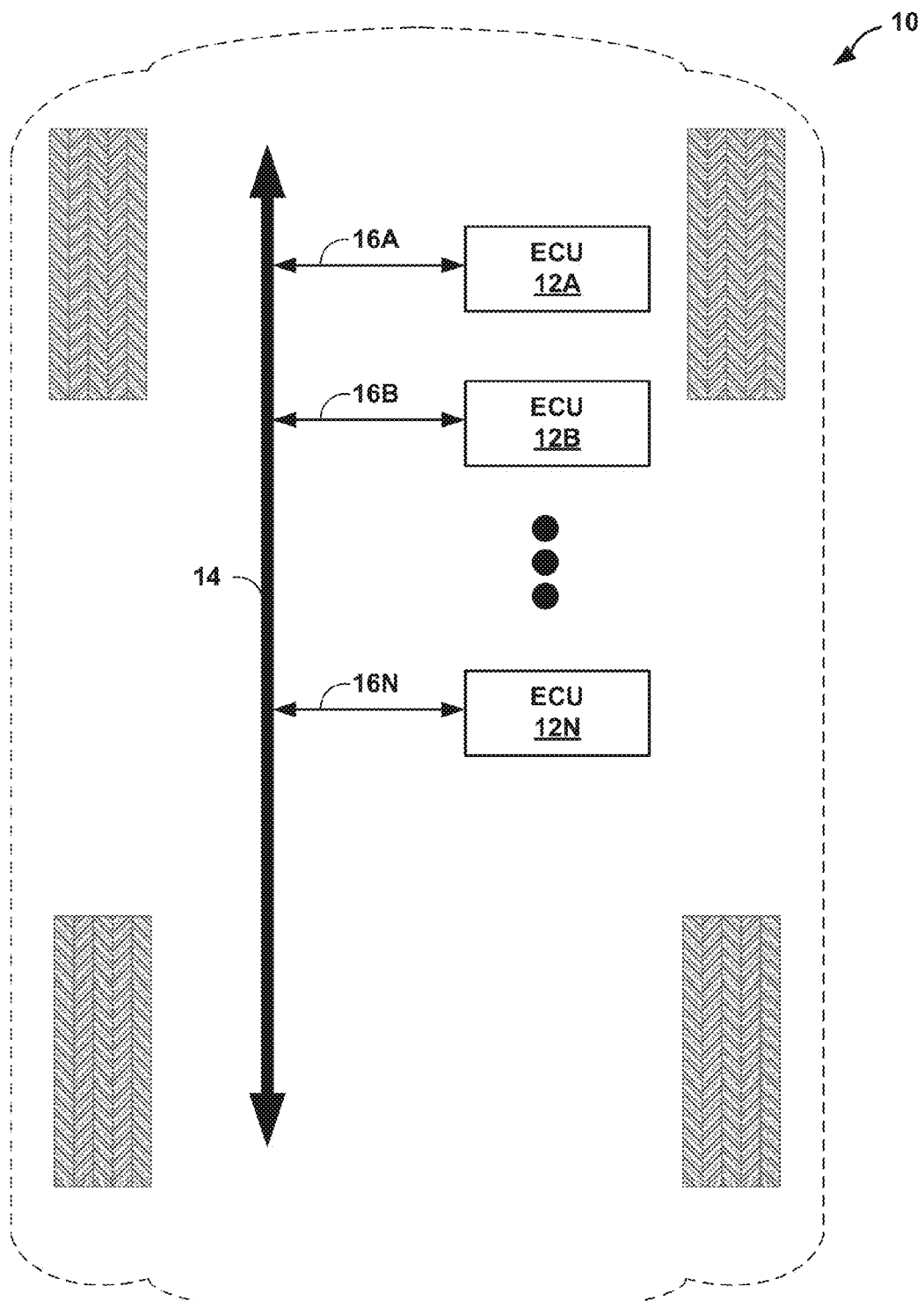
FIG. 1 is a conceptual diagram illustrating an example system having nodes that communicate across a bus, in accordance with one or more aspects of the present disclosure.

In low voltage differential signal communication, a bus driver may use various over-current protection and handling techniques to prevent over-current conditions across a shared bus from either damaging or otherwise interfering with the nodes on the bus. For instance, in example a bus driver may utilize an inherently limiting output stage. That is, an inherently limited bus driver may rely on the self-limiting characteristic of a MOSFET that produces a current source with an inherent high impedance output behavior. This type of driver generally requires a well-defined gate bias to be applied either directly to the switching device of the driver, or to the low side transistor of a cascade configuration. In a driver such as this, when a bridge configuration of switches is used, every switch of the bridge configuration must contain a limitation function in order to handle all the various types of short circuit conditions that may occur on the bus (bus to ground, bus to supply, bus to bus). A drawback of this type of bus driver is that all the branches of the bridge must be symmetrically limited. Any violation of this symmetry requirement (if power is injected to the driver) may incorrectly generate a differential signal at the output stage of the driver, even in drivers that include symmetrical coupling. As a result, this type of driver may produce a poor "eye diagram" and poor signal integrity and as such be sub-optimal for bus communication applications.

In another example, a driver includes a feedback control feature of the output stage. For instance, a regulation loop connected to the output stage of the driver can be activated as soon as an output (e.g., a sensed current) exceeds a threshold. As in the example described above, driver stability issues (e.g., poor eye diagram characteristics) arise since this technique depends on the amount of external load. These limitations may be minimized, in principle if very strict timing constraints are maintained, however in case of a communication bus driver, maintaining very strict timing requirements can be difficult. Like the inherently limited output stage as described above, the feedback control techniques may often produce poor a driver having poor "eye diagram" and poor signal integrity and as a result, also be sub-optimal for bus communication applications.

In yet another example, a driver with a low impedance output having specific voltage source characteristics may be used. Unlike the regulation loop described above, these drivers may perform over-current sensing and shutdown. These drivers may be used in applications that may be susceptible to high, near instantaneous, power dissipation in a current limitation mode, which may cause overheating of the bus driver and connected components within a few microseconds (µs). These drivers are sometimes referred to as "V-source Output Drivers" and tend not to introduce a change of output level if power injection is present. For instance, in these type of drivers, a current increase is tolerated, up to a predefined level. When the current exceeds the predefined level, an over-current flag is set and causes one of two responses. The first response to the over-current flag may be to completely shutdown the H-bridge and prevent and further bus transmission. The other response may be to partially shut down the H-bridge by increasing the output resistance of the driver. Some bus transmission may still be possible when partially shutting down the H-bridge, however these transmissions may violate the bus transmission specification and/or transmission protocol.

A differential bus voltage generated by a V-source Output Driver may be less susceptible to high disturbance scenarios, even if exposed to noise injection at the bus. As a result, V-source Output Drivers may be a preferred bus driver for shared bus communication. However, even the V-source Output Drivers have some disadvantages. For instance, when the bus experiences noise being injected at extreme levels, the noise may trigger a complete shutdown of a branch of the H-bridge since the over-current trigger level of the branch may be exceeded. If the V-source Output Driver does not distinguish between true short circuit conditions and over-current produced by high disturbance levels, the V-source Output Driver may not satisfy the "eye diagram" requirements of the bus specification and/or transmission protocol.

The techniques described in this disclosure are related to techniques and circuits for determining an over-current condition at a control input coupled to a branch of a driver unit that drives a signal line of a differential bus. In some examples, the driver unit is a component or circuit of a node, such as an electronic control unit (ECU) that communicates with other nodes of a system. The driver unit may receive communication signals being transmitted across the bus from other nodes of the system and may transmit communication signals, on behalf of the node, across the bus to the other nodes of the system. In response to determining an over-current condition, the driver unit may adjust the branch of the driver unit where the over-current condition is detected to prevent the over-current condition from impacting the operation of the node. For example, the driver unit may shut down the branch where the over-current is detected by closing a switch at the branch and/or adjust the resistance of a load at the branch to prevent the over-current condition from damaging or otherwise effecting the operation of the node.

In order to perform current "spike" filtering (e.g., noise) without completely filtering and/or missing a transmitted bit, the driver unit according to these techniques may perform minimum analog filtering of over-current conditions in accordance with a minimum bit length of the data being transmitted across the bus. In other words, the driver unit can perform over-current detection and handling of noise in the bus without filtering out an actual over-current condition or an entire data transmission that may overlap the noise. In this way, only an actual over-current condition, that spans an amount of time in proportion to a bit length is treated as an over-current condition while "spikes" or noise are filtered.

In addition, the driver unit according to these techniques may perform deterministic sampling of over-current comparator signals in synch with a data input (TxD) to ensure over-current sampling occurs at least one time per bit transmission. In other words, by synchronizing the frequency that over-current sampling occurs, the driver unit may guarantee a minimum of at least one over-current sample being taken per transmitted bit. The driver unit may sample for over-current conditions with each change in the data input. In addition, the driver unit may perform periodic sampling for longer data bits or sequences of two or more equal bits (e.g., a long period of unchanged data) to protect from over-current situations that may occur during a long (i.e., unchanged) data sequence.

In addition, the driver unit according to these techniques may perform independent counting of over-current conditions at each branch of a multi-branch bridge circuit to determine when an over-current condition actually exists (e.g., and is not noise) and at which branch the over-current condition exits. In case of counter overflow for any one of the branches, the driver unit in accordance with these techniques can shut down or otherwise handle an over-current condition at that particular branch without completely shutting down the entire bridge. The driver unit according to these techniques may reset a branch counter stages in cases when the driver unit determines inconsistencies exist between the data input and/or over-current flags in branches. As such, the driver unit ensures that no false triggering of over-current conditions occur, e.g., when direct power injection (DPI) is being used.

FIG. 1 is a conceptual diagram illustrating example system 10 having multiple nodes that communicate across a bus, in accordance with one or more aspects of the present disclosure. FIG. 1 shows system 10, as one example, as being part of an electrical communication system of a vehicle (e.g., an automobile). The techniques of this disclosure should not however be limited to vehicle communication systems. The following techniques are applicable to any system including two or more nodes that communicate data across a bus.

System 10 includes electrical control units 12A, 12B, and 12N (collectively "ECUs 12") that each individually represent a single node of system 10. Each one of ECUs 12 may control a different part of system 10. Examples of ECUs 12 may include, but are not limited to, an engine control unit, an automotive system control unit, a manufacturing system control unit, an aircraft or marine system control unit, a media system control unit, or any other unit for controlling an electrical system by communicating on a bus.

Each one of ECU 12A, ECU 12B, and ECU 12N are electrically coupled to bus 14 via a respective one of links 16A, 16B, and 16N (collectively "links 16"). In other words, links 16 represent the physical electrical connections (e.g., one or more wires, traces, vias, links or other electrical connections) shared between bus 14 and each one of ECUs 12. Although each of links 16 is shown as a single line, links 16 can be any combination of one or more physical electrical connection between bus 14 and each of ECUs 12. For instance, link 16A may represent one or more wires or electrical traces that electrically connect ECU 12A to bus 14. The terms "link" and "data path" may be used synonymously throughout this disclosure to describe a physical and/or logical communication path between two or more components of system 10 and related sub-components.

Two of ECUs 12 may communicate with each other by transmitting and/or receiving data across bus 14. For example, ECU 12A may communicate with ECU 12N by transmitting and receiving electrical signals that represent data being communicated between different parts of system 10. These electrical signals may be transmitted across one or more wires or traces of bus 14. For instance, ECU 12A may be an electrical braking controller of an automobile equipped with a drive-by-wire automobile system that receives data or commands from ECU 12N (e.g., a brake pedal controller) in response to ECU 12N registering a force applied to a brake pedal of the automobile. ECU 12N may transmit a differential voltage signal to ECU 12A over two wires of bus 14. ECU 12A may measure the differential voltage signal across two wires of bus 14 and interpret the signal as data. ECU 12A may determine the data represents a command from ECU 12N to engage a mechanical braking system controlled by ECU 12A to slow the automobile.

ECUs 12 may send data across bus 14 as one or more messages. ECUs 12 may format these messages in accordance with a message-based protocol, such as Controller Area Network (CAN) protocol, FlexRay™ protocol, Ethernet protocol or another type of message-based communication protocol. Each one of ECUs 12 that communicate according to these message-based protocols may rely on timing restrictions and specific data message headers defined by these protocols to minimize and prevent data communications between two ECUs 12 from interfering with the data communications between two different ECUs 12. For instance, ECU 12A and ECU 12B may communicate by passing messages in accordance with these protocols without interfering with the communication messages passed between ECU 12B and ECU 12N, even though ECU 12A, 12B, and 12N may send their respective messages using the single shared bus 14.

Figure 2:
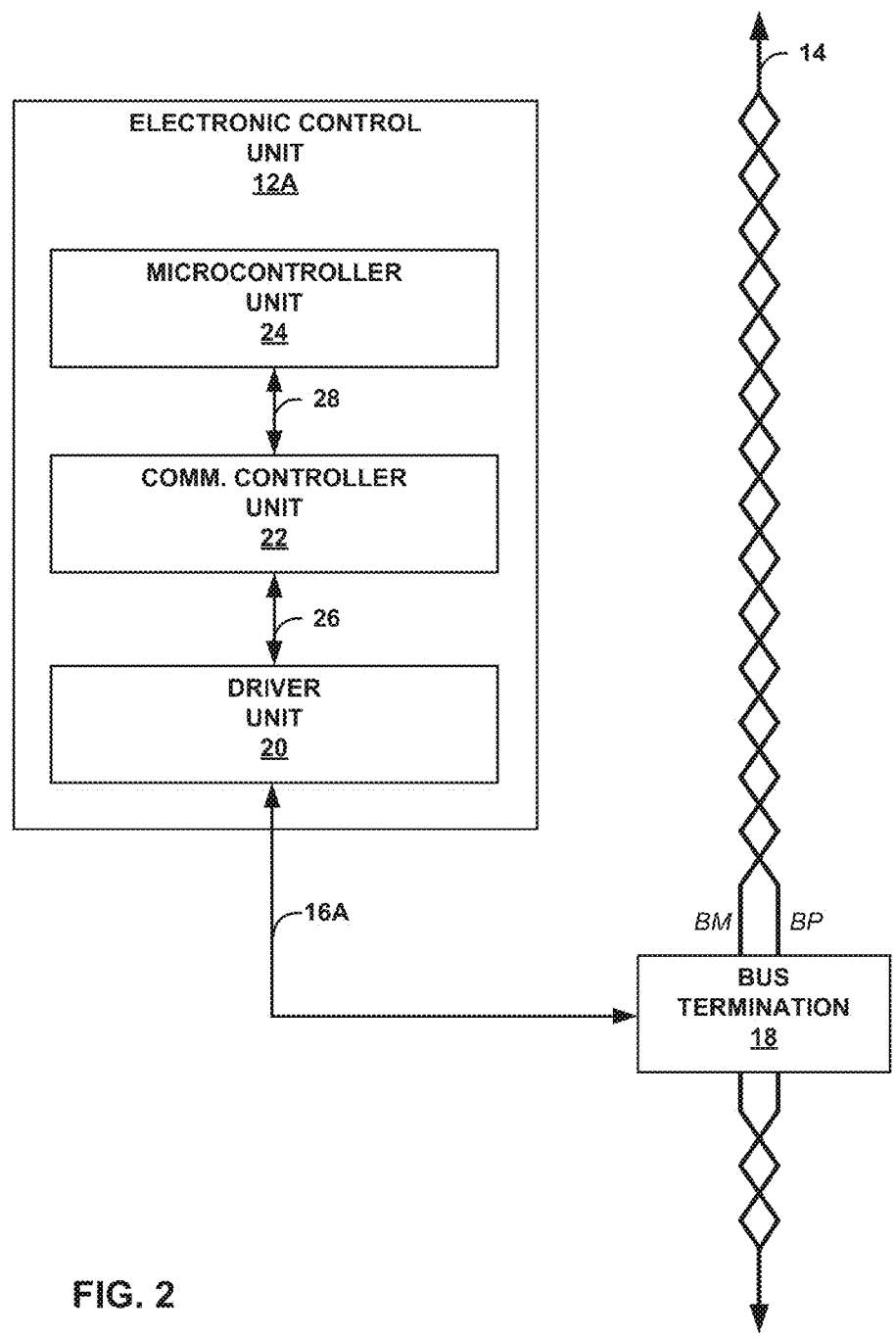
FIG. 2 is a conceptual diagram illustrating an example electrical control unit as one example of the nodes of the system shown in FIG. 1.

FIG. 2 is a conceptual diagram illustrating an electronic control unit as one example of the nodes of system 10 shown in FIG. 1. For instance, FIG. 2 shows a more detailed exemplary view of ECU 12A of system 10 from FIG. 1 and the electrical connection to ECU 12A shared by link 16A and bus 14.

As described above, electrical signals are passed between ECU 12A and bus 14 over link 16A. Bus termination 18 represents a physical connection or termination point of bus 14. Bus termination 18 terminates or connects the wires or electrical traces of bus 14 to one or more wires or traces of link 16A.

For example, FIG. 2 illustrates bus 14 as a twisted pair of wires used to transmit a differential voltage signal from one ECU to another. Although only a single twisted pair is shown, bus 14 may include multiple twisted and/or untwisted pairs of wires or traces. In simplest form, bus termination 18 represents a single termination resistor having each end connected to a different one of the wires (e.g., BP and BM) in the twisted pair of bus 14.

Similarly, link 16A may also represent a twisted or untwisted pair of wires that each connect to a different end of the termination resistor of bus termination 18. ECU 12A can receive a differential voltage signal measured across bus termination 18 via link 16A and based on the differential voltage signal ECU 12A may determine the data content of a message transmission being transmitted on bus 14.

ECU 12A includes micro controller (MC) unit 24, communication controller (CC) unit 22, and driver unit 20 that each perform separate functions for controlling a portion of a system (e.g., system 10 of FIG. 1). ECU 12A may include additional or fewer units than those shown. Units 20, 22, and 24 may be implemented as standalone, or a combination of, hardware, software, and/or firmware. Data paths 26 and 28 represent communication links between units 20, 22, and 24 of ECU 12A. For instance, data path 28 may carry data transmitted and/or received between MC unit 24 and CC unit 22 and data path 26 may carry data transmitted and/or received between CC unit 22 and driver unit 20. The terms "link" and "data path" may be used synonymously throughout this disclosure to describe a physical and/or logical communication path between two or more components of ECU 12A and related sub-components.

Driver unit 20 is discussed in further detail below with respect to the additional figures, however in summary, driver unit 20 represents a physical interface unit between ECU 12A and bus 14. Driver unit 20 may provide ECU 12A with differential transmit and receive capability using bus 14, and may allow ECU 12A to perform bidirectional time multiplexed binary data stream transfers with another ECU on bus 14. For example, driver unit 20 may receive an electrical signal transmitted over link 16A and convert the electrical signal into a binary data output for CC unit 20 or conversely, receive a binary data input from CC unit 20 and convert and transmit the binary data as an electrical signal over link 16A. Besides providing functionality for transmitting and receiving data across bus 14, driver unit 20 may also provide ECU 12A with low power management functionality, supply voltage monitoring functionality, and/or bus failure detection functionality. For example, driver unit 20 may include protection and/or shutdown logic to prevent an over-current condition at bus 14 from interfering with ECU 12A.

CC unit 20 and MC unit 24 may perform the logical functionality of ECU 12A for controlling various peripheral devices connected to ECU 12A, such as sensors, actuators, or any other types of peripheral devices. For instance, CC unit 20 may receive binary data from driver unit 20 and assemble and format the data according to a message-based-protocol and transmit the formatted message data to MC unit 24. MC unit 24 interpret the formatted message data from CC unit 20 in response, command, control, or otherwise direct one or more peripherals being connected to ECU 12A. Conversely, MC unit 24 may receive input data from the peripherals connected to ECU 12A and in response, transmit data, commands, measurements, or other information as messages for transmission over bus 14, to CC unit 20. CC unit 20 may receive these messages as binary data from MC unit 24 and transmit the binary data, according to a message-based-protocol, to driver unit 20 for transmission as one or more differential signals, across bus 14.

Figure 3:
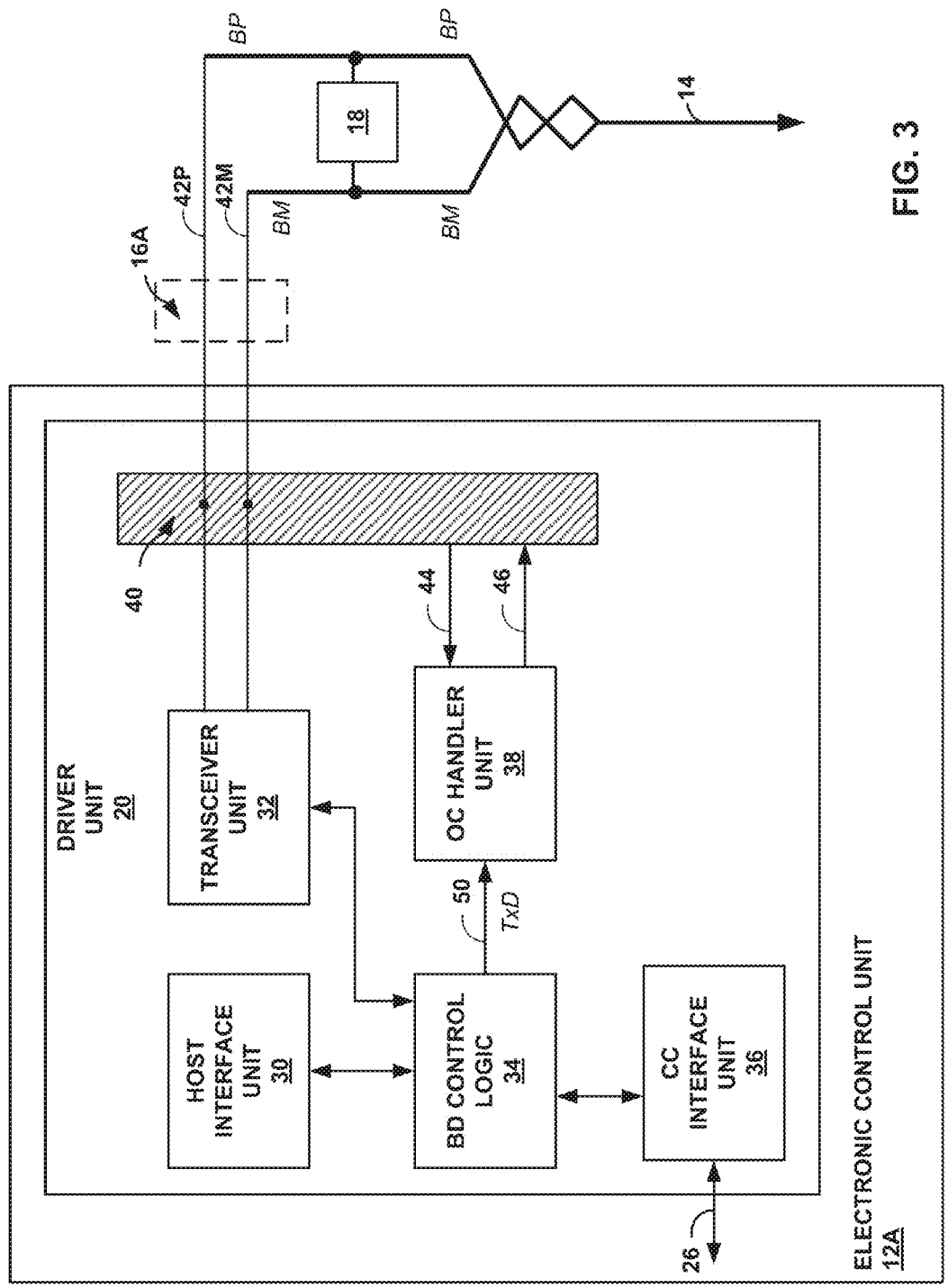
FIG. 3 is a conceptual diagram illustrating an example driver unit of a node for driving a signal across a bus, in accordance with one or more aspects of the present disclosure.

FIG. 3 is a conceptual diagram illustrating an example driver unit 20 of a node for driving a signal across a bus, in accordance with one or more aspects of the present disclosure. For example, FIG. 3 shows in greater detail, driver unit 20 of ECU 12A described above in FIG. 2.

Figure 4:
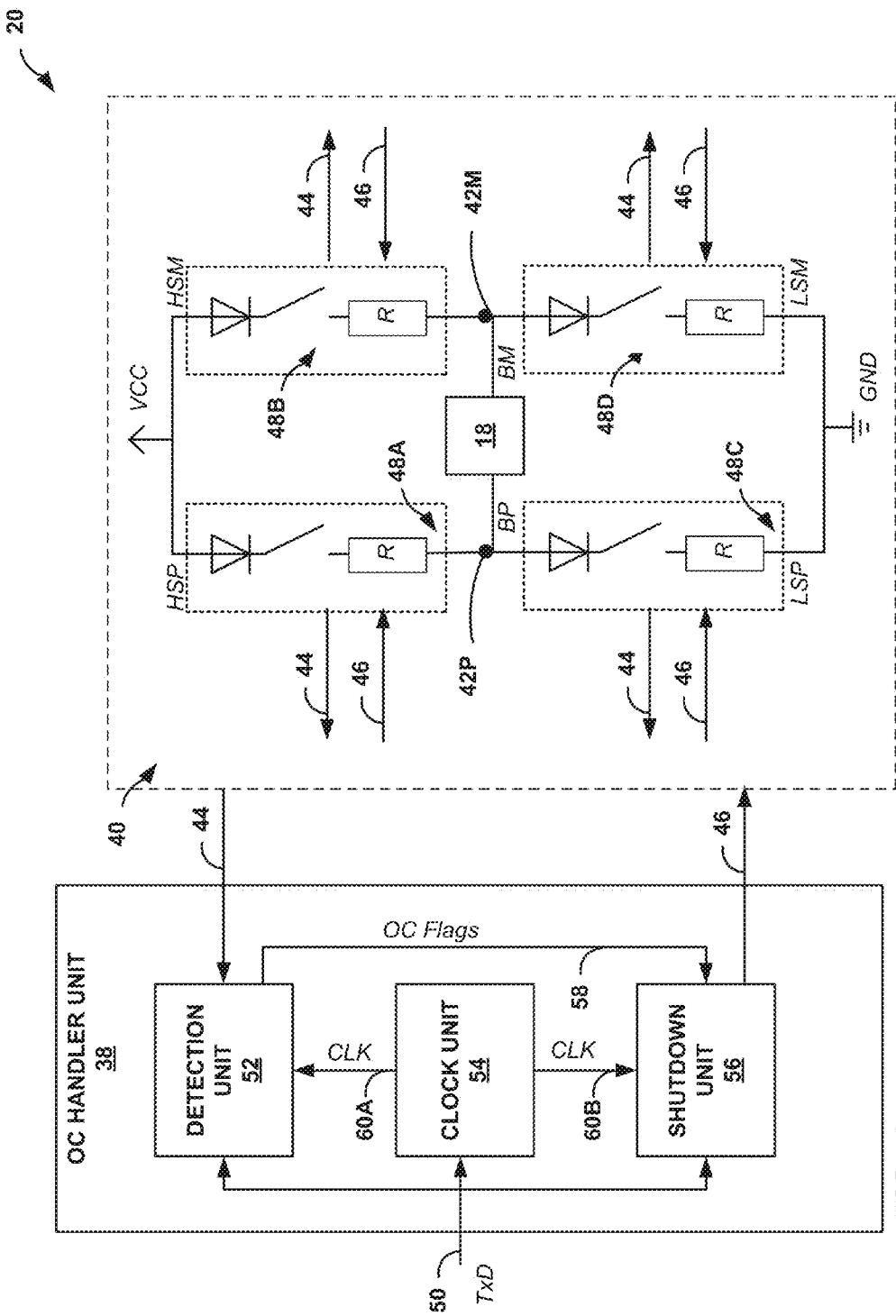
FIG. 4 is a conceptual diagram illustrating an example bridge circuit and over-current handler unit of the example driver unit.

Driver unit 20 includes bridge circuit 40 (or simply bridge 40), an example of which is shown in FIG. 4. Driver unit 20 of FIG. 3 physically couples ECU 12A to bus 14 through a shared connection with link 16A and bus termination 18 at bridge circuit 40. For example, driver unit 20 may drive a differential voltage signal at bridge circuit 40 and across bus termination 18 to transmit data from ECU 12A to a different ECU connected to bus 14. Link 16A is illustrated as two inputs lines 42P and 42M (or simply input 42P and 42M). Inputs 42P and 42M each connect to different ends of bus termination 18 and bridge circuit 40. Input 42P shares a connection at bus termination 18 with a bus plus (BP) signal line of bus 14 and input 42M shares a connection at bus termination 18 with a bus minus (BM) signal line of bus 14.

Driver unit 20 may perform differential signaling across bus 14 by transmitting (or receiving) information as the difference between the voltages across BP and BM at bridge 40. In other words, when receiving a differential voltage signal, driver unit 20 may compare the voltages across BP and BM at bridge 40. Driver unit 20 may determine the polarity of the differential voltage to determine a logic level (e.g., a logical zero or one for binary transmission) of the data being transmitted over bus 14 and convert the differential signal based on the logic level to a binary data output at data path 26. When transmitting data across bus 14, driver unit 20 may encode the data as a differential voltage signal applied across BP and BM at bridge 40. The encoded data may have a polarity that corresponds to the logic level of the data being transmitted.

Driver unit 20 includes host interface unit 30, transceiver unit 32, bus driver (BD) control logic 34, communication controller (CC) interface unit 38, and over-current (OC) handler unit 38. Units 30, 32, 36, and 38, as well as BD control logic 34 may be implemented as standalone, or a combination of, hardware, software, and/or firmware. Units 30, 32, 36, and 38, as well as BD control logic 34 may communicate with each other by sending data and/or electrical signals via adjoining links or data paths. Again, the terms "link" and "data path" may be used synonymously throughout this disclosure to describe a physical and/or logical communication path, such as between two or more components of driver unit 20 and related sub-components.

BD control logic 34 acts as the internal logic for converting outputs from each of units 30, 32, 36, and 38 into corresponding inputs to each of units 30, 32, 36, and 38 to manage the overall operation and functionality of driver unit 20. BD control logic 34 may be modeled conceptually as a state machine that places driver unit 20 in a predetermined state depending on the logic values of the different signals being outputted at any given time by each of units 30, 32, 36, and 38. For example, BD control logic 34 may receive a transmit data signal from CC interface unit 36. BD control logic 34 may delay or modify the transmit data signal prior to passing the signal on to transceiver unit 32. The delay or modification to the transmit data signal may cause transceiver unit 32 to correctly perform the functionality being commanded by the transmit data signal and may prevent the transmit data signal from interfering with other operations or functions being performed by transceiver unit 32. In addition, BD control logic 34 may output the transmit data signal to OC handler unit 38 to cause OC handler unit 38 to perform some other functionality of driver unit 20 that is separate and independent of the operations being performed by transceiver unit 32.

Transceiver unit 32 acts as both a transmitter and a receiver of differential voltage signals for driver unit 20. Transceiver unit 32 is connected to the BP and BM lines of bus 14 through shared connections at bridge circuit 40 to inputs 42P and 42M. Transceiver unit 32 may receive differential signals at inputs 42P and 42M and/or transmit differential signals at inputs 42P and 42M. Transceiver unit 32 is connected to BD control logic unit 34. Transceiver unit 32 may output a differential signal received across bus 14 to BD control logic unit 34 and BD control logic unit 34 may conversely output a differential signal to transceiver unit 32 for output across bus 14. Transceiver unit 32 may control one or more switches of bridge 40 to alter the polarity of a voltage across bus termination 18, and as such, alter whether driver unit 20 is driving a logical one or a logical zero differential signal at the BP and BM signal lines of bus 14.

Host interface unit 30 provides an interface for a human and/or a machine to program, command, or otherwise interact with driver unit 20. For instance, host interface unit 30 may enable a human and/or a machine to control operational modes of driver unit 20 and read status and diagnosis information from driver unit 20.

CC interface unit 36 provides an interface between driver unit 20 and a communication controller of ECU 12A, such as CC unit 22 of FIG. 2. CC interface unit 36 may transmit and receive data to and from CC unit 22 using data path 26. For example, CC interface unit 36 may receive a transmit data signal (TxD) and transmit enable not signal (TxEN) from CC unit 22 over data path 26. TxD may represent a binary data stream, such as a message, that CC unit 22 has generated for transmission across bus 14. TxEN may represent an enable data bit that indicates to BD control logic 34 of driver unit 20 whether TxD represents a valid (i.e., ready for transmission) binary data stream. CC interface unit 36 may transmit a receive data signal (RxD) to CC unit 22 over data path 26 when transceiver unit 32 receives a differential voltage signal at inputs 42P and 42M. In addition, CC unit 22 may assert TxEN (e.g., to one logic level or another) which may cause BD control logic 34 to transmit the binary data stream TxD to transceiver unit 32 for transmission as a differential voltage signal at inputs 42P and 42M. BD control logic may relay the transmit data signal (TxD) received by CC interface unit 36 on to OC handler unit 38 via data path 50 (e.g., via a wire, buffer, trace, contact, via, or other connection).

OC handler unit 38 performs over-current detection and protection functionality for driver unit 20. In other words, OC handler unit 38 can detect an over-current condition across bus 14 and in response, reconfigure driver unit 20 to prevent the over-current condition from damaging or otherwise interfering with the operations of driver unit 20 and ECU 12A. Over-current detection and handling operations performed by OC handler 38 are described in further detail below with respect to the additional figures, however in summary, OC handler unit 38 may receive status data of bridge 40 and may control bridge 40 based on the status data.

OC handler unit 38 may determine whether an over-current condition exists at bus 14 based on information received at data path 44. In response to an over-current detection, OC handler unit 38 may control the operations of bridge 40 by sending output signals at data path 46 to prevent or otherwise limit adverse effects that an over-current condition may otherwise cause to driver unit 20.

OC handler unit 38 may operate synchronously with a change in data detected at the transmit data signal received from BD control logic 34 and CC interface unit 36. OC handler unit 38 may synchronize with the transmit data signal in order to limit over-current handling and detection functionality to those instances when driver unit 20 is actually transmitting data across bus 14. For instance, OC handler 38 may receive an input from BD control logic 34 over data path 50 that corresponds to the TxD output from CC interface unit 36. When CC interface unit 36 outputs a signal at TxD, BD control logic 34 may route the TxD signal to transceiver unit 32 to enable transmission of data across bus 14, and in parallel, also route the TxD signal to OC handler unit 38. OC handler unit 38 may receive the TxD signal from BD control logic 34 and in response, OC handler unit 38 may determine whether an over-current condition exists across bus 14 based on the information received at data path 44. If OC handler unit 38 determines that an over-current condition exists, OC handler unit 38 may output control signals to bridge 40 to "shut down" parts or all of bridge 40 and prevent the over-current condition from damaging or otherwise interfering with operations of driver unit 20.

A bus driver having an current handler unit, such as OC handler unit 38 of driver unit 20, may prevent permanent over-current conditions in external passive components that are coupled to the driver unit (e.g., components of ECU 12A). In addition, the over-current handler unit may prevent over-heating of the driver unit as a result of an over-current condition. In addition, the bus driver such as this may maintain data transmission for "soft" short circuits and under high disturbance level (e.g. DPI) and detect only real over-current situations (e.g. avoid false triggering of over-current circuit caused by noise on data lines) and provide safe detection for both, static output state (bus data, conformance test conditions) transmissions as well as real-world data transmissions (e.g., toggling).

FIG. 4 is a conceptual diagram illustrating an example of bridge circuit 40 and over-current handler unit 38 of the example driver unit 20 shown in FIG. 3. FIG. 4 is described below within the context of system 10 of FIG. 1, ECU 12A of FIG. 2, and driver unit 20 of FIG. 3.

Bridge 40 represents an H-bridge circuit coupled to two signal lines (e.g., BP and BM) of bus 14 at bus termination 18. Bridge 40 is connected to bus termination 18 at input 42P and 42M and transceiver unit 32 of driver unit 20 can determine a differential signal applied to bus 14 based on the difference between voltage measurements taken at input 42P and 42M. Bridge 40 includes four separate branches designated as high side plus (HSP), low side plus (LSP), high side minus (HSM), and low side minus (LSM) that may typically be used in message based protocols such as FlexRay and Ethernet. Although described herein as having four branches, the techniques described herein could be applied to other message based protocols that utilize bridge circuits with fewer than four or more than four branches (e.g., CAN that uses dual branch bridge circuits).

The high side branches HSP and HSM of bridge 40 are connected to the power supply ($V_{CC}$) of driver unit 20 while the low side branches LSP and LSM of bridge 40 are connected to ground (GND). Each branch includes a switch connected to either power or ground, followed in series by a load (e.g., resistor), which is connected to input 42P or 24M. In some examples, the switch of each branch may be a p-channel or n-channel MOSFET transistor. In some examples, the load of each branch may be a ten Ohm resistor, an adjustable resistor, or any other size resistor or electrical load used in a branch of a bridge circuit. Driver unit 20 (e.g., using transceiver unit 32 of FIG. 3) can control the switches of the branches of bridge 40 to alter the polarity of a voltage across bus termination 18, and as such, alter whether driver unit 20 is driving a logical one or a logical zero differential signal at the BP and BM signal lines of bus 14.

For instance, driver unit 20 may cause the switches of both the HSP and the LSM branches to be closed, the switches of both the HSM and the LSP branches to be open, and as a result cause the polarity of the voltage across bus termination 18 (e.g., measured from input 42P to input 42M) to be positive. Conversely, driver unit 20 may cause the switches of both the HSP and the LSM branches to be open and the switches of both the HSM and the LSP branches to be closed, and the polarity of the voltage across bus termination 18 (e.g., measured from input 42P to input 42M) to be negative. The polarity of the differential voltage signal driven by driver unit 20 across bus termination 18 may indicate to another node connected to bus 14 either that driver unit 20 is signaling on BP and BM lines of bus 14 data with logical value of either high or low. For instance, a positive voltage may indicate a logical high and a negative voltage may indicate a logical low. Driver unit 20 may open and close the switches of bridge 40 at different rates and frequencies to signal multiple bits of data to represent a transmit data signal received by CC interface unit 36.

OC handler 38 can control each branch of bridge 40 independently, by sending commands over a single data path 46 to bridge 40. OC handler 38 can monitor and or measure the state of each branch independently by receiving information over data path 44 related to measurements (e.g., voltage levels, current levels, or other measurements) taken at the respective load of one or more branches of bridge 40. The terms "link" and "data path" may be used synonymously throughout this disclosure to describe a physical and/or logical communication path between two or more components of OC handler 38 and related sub-components.

For instance, OC handler 38 may send a command (e.g., an electrical signal) over data path 46 to adjust the state of a respective switch and/or the resistance of a respective load of one or more of the four branches. OC handler 38 may send a command over data path 46 that causes the switch of the HSP branch of bridge 40 to open or close. In addition, OC handler 38 may send a command over data path 46 to increase and/or decrease the resistance of the load of the LSM branch of bridge 40.

OC handler 38 may monitor and/or measure the state of each branch by receiving measurements from bridge 40 over data path 44. For instance, OC handler 38 may receive, via data path 44, a current and/or voltage measurement taken at the respective load of one or more of the four branches of bridge 40. Based on the current and/or voltage measurement, OC handler 38 may determine whether an over-current condition exists at that respective branch.

OC handler unit 38 includes detection unit 52, clock unit 54, and shutdown unit 56. Units 52, 54, and 56 may be implemented using a combination of one or more of hardware, software, and/or firmware. OC handler 38 may receive a transmit data signal (TxD) via data path 50 (e.g., from BD control unit 34) and synchronize over-current detection and branch shutdown logic of OC handler 38 based at least in part on the transmit data signal. OC handler 38 may receive information from bridge 40 via data path 44 to detect an over-current condition at bridge 40 and transmit commands to bridge 40 via data path 46 to shut down or adjust a branch of bridge 40.

Detection unit 52 may perform over-current detection techniques on behalf of OC handler 38. For instance, detection unit 52 may receive information via data path 44 about the current and/or voltage at one or more of the branches of bridge 40. Based on the information, detection unit 52 may determine an over-current condition exists at one or more branches of bridge 40.

Shutdown unit 56 may perform branch shutdown techniques on behalf of OC handler 38 to prevent and/or limit the impact and over-current condition may have on bus driver 20 and or components coupled to bus driver 20. For example, detection unit 52 may determine an over-current condition exists at one or more branches of bridge 40 and send data via data path 58 to shutdown unit 56 about the over-current condition. The data may include information that indicates whether and at which of the one or more branches of bridge 40 an over-current condition is detected. Based on the data received over data path 58, shutdown unit 56 may send a command via data path 46 to change the state of the respective switch and/or adjust the respective load of the one or more branches of bridge 40 where the over-current condition is detected.

Clock unit 54 may synchronize the operations performed by detection unit 52 and shutdown unit 56 with the transmit data (TxD) input received via data path 50. In other words, rather than utilize a common clock signal of ECU 12A or bus 14, detection unit 52 and shutdown unit 56 may synchronize with a clock output from clock unit 54. The clock may indicate to detection unit 52 when to sample each of the branches of bridge 40 for over-current conditions and the clock may indicate to shutdown unit 56 when to adjust one or more of the branches of bridge 40 based on a detected over-current detection. A rising and/or falling edge of the clock signal generated by clock unit 54 may be based on a detected change in the data at the transmit data input. In other words, a change in the data at the transmit data input may trigger clock unit 54 to transmit a clock pulse to detection unit 52 and shutdown unit 56.

In accordance with techniques of this disclosure, driver unit 20 may detect a change in data at a transmit data input of a driver unit coupled to a bus for driving at least one signal line of the bus. For example, clock unit 54 of driver unit 20 may detect a change (e.g., a rising or falling edge) of a binary data transmission received across data path 50. The change may indicate to clock unit 54 that a data has been received by driver unit 20 for transmission across bus 14. Clock unit 54 may output a clock signal via data path 60A to detection unit 52 and via data path 60B to shutdown unit 56. Although illustrated as two separate data paths, data path 60A and 60B may in some examples be the same data path. Nevertheless, the same clock signal is transmitted to detection unit 52 and shutdown unit 56 regardless of whether data paths 60A and 60B are either a single data path or separate data paths. Both detection unit 52 and shutdown unit 56 may receive and synchronize with the clock signal from clock unit 54.

In some examples, in order to detect an over-current event during a long constant data phase (e.g., without a change in the value of the data at the transmit data input), clock unit 54 may automatically generate a clock signal to cause detection unit 52 and shutdown unit 56 to detect and handle a possible over-current condition during the long constant data phase. For instance, clock unit 54 may determine an amount of time since the last change in the data at the transmit data input. In response to determining the amount of time exceeds a predetermined amount of time (e.g., a bit length of data), clock unit 54 may transmit a clock signal to detection unit 52 and shutdown unit 56 even though no change in the data at the transmit data input is detected.

Driver unit 20 may detect a current through at least one branch of the driver unit in response to the change. For example, in response to the clock signal received from clock unit 54, detection unit 52 may determine (e.g., measure) the current at each of the four branches (HSP, HSM, LSP, and LSM) of bridge 40.

Driver unit 20 may determine an over-current condition at the at least one branch based on the detected current. For example, detection unit 52 may compare the current measured at each branch of bridge 40 to an over-current threshold that represents a maximum current expected at that branch under normal (i.e., non-over-current) conditions. If the current does not satisfy the over-current threshold, detection unit 52 may determine that an over-current condition exists at that branch.

In some examples, detection unit 52 may adjust the over-current threshold of a particular branch based on the data received at the transmit data input of driver unit 20. FIG. 4 shows that the transmit data input is received by detection unit 52. Detection unit 52 may determine one threshold value if the data at transmit data input represents a logical zero and may determine a different threshold value if the data at transmit data input represents a logical one. In other words, each type of over-current condition, whether a short across a switch associated with either the HSM, HSP, LSM, or LSP branch of bridge 40, may have its own current signature (e.g., magnitude) depending on whether the transmit data input is driving a logical zero or one (e.g., D0 or D1), therefore detection unit 52 may "synchronize" the current measurement and comparison to the over-current thresholds based on the data at the transmit data input.

For instance, when the data at the transmit data input represents a logical one, driver unit 20 may close the switches associated with the HSP and the LSM branches and open the switches associated with the HSM and the LSP branches. Therefore when no over-current condition exits at any of the branches of bridge 40, detection unit 52 should determine a non-zero current across the HSP and the LSM branches and a near-zero current across the HSM and the LSP branches. Conversely, when driving data that represents a logical zero, driver unit 20 may open the switches associated with the HSP and the LSM branches and close the switches associated with the HSM and the LSP branches. Therefore when no over-current condition exits at any of the branches of bridge 40, detection unit 52 should determine a near-zero current across the HSP and the LSM branches and a non-zero current across the HSM and the LSP branches.

The threshold value used by detection unit 52 to determine whether an over-current condition exists at either the HSP or the LSM branches when the data represents a logical one may be greater than the threshold value used to determine whether an over-current condition exits at either the HSM or the LSP branches. Conversely, the threshold value used to determine whether an over-current condition exists at either the HSP or the LSM branches when the data represents a logical zero may be less than the threshold value used to determine whether an over-current condition exits at either the HSM or the LSP branches.

In some examples detection unit 52 may sample the current of the branches of bridge 40 and determine whether over-current conditions exist and any of the branches a single time after each change in the data at the transmit data input. In other words, the clock signal received by detection unit 52 may cause detection unit 52 to perform a single determination of whether an over-current condition exists, just after clock unit 54 detects a change in the data at the transmit data input (e.g., data path 50).

In some examples, to improve the robustness of OC handler unit 38, and to prevent OC handler unit 38 from falsely detecting an over-current condition at bridge 40, clock unit 54 may periodically send a clock signal to detection unit 52 after each change in data at data path 50. The periodic clock signal may cause detection unit to periodically determine whether an over-current condition exists at bridge 40, even after a period of time when no change in data is detected, or a long period of time when the data at the data transmit input (e.g., data path 50) remains unchanged.

For example, clock unit 54 may include a counter that resets with each detected change in data. Clock unit 54 may automatically increment the counter at a periodic rate, and if the counter reaches a maximum count prior to a change in the data at the transmit data input, clock unit 54 may send a clock signal (e.g., a pulse) to detection unit 52 and shutdown unit 56 to determine whether an over-current condition exits. In some examples, the maximum count may be approximately proportionate to one or more bit lengths (e.g., a bit length may represent a time duration or period of a single bit of data across bus 14). In this way, OC handler unit 38 may detect and handle overcurrent conditions at bridge 40 even in the event that a long duration of time lapses between changes in the data at the transmit data input.

Detection unit 52 may send data via data path 58 to shutdown unit 56 that flags, or otherwise indicates, at which (if any) of the branches of bridge 40 that an over-current condition is detected. Shutdown unit 56 may receive the data from detection unit 52 and based on the data, and determine at which (if any) of the one or more of the branches of bridge 40 to shut down or otherwise limit the current. In other words, shutdown unit 56 may validate whether the information received from detection unit 52 actually indicates an over-current condition or if the information represents a "false" indication of an over-current condition. In the case of a valid over-current condition, shutdown unit 56 may shut down one or more of the branches of bridge 40.

For example, based on the data from detection unit 52, shutdown unit 56 may determine that the data represents an indication (e.g., a flag) that an over-current condition is detected by detection unit 52 at the HSP branch of bridge 40. Shutdown unit 56 may determine whether any other over-current conditions at any other branches of bridge 40 are indicated by the information and determine whether the over-current condition is a valid or a false trigger. In some examples, shutdown unit 56 receives the transmit data signal via data path 50 and based on the transmit data signal, determines whether the over current condition is a valid overcurrent condition. For instance, the validity of an over-current condition may vary based on whether the data at the transmit data input represents either a logical zero or a logical one.

In some examples, shutdown unit 56 may validate a first over-current condition at a first branch based at least in part on a value of the data and a second over-current condition at a branch other than the first branch. In some examples, the second over-current condition may not be a validated over-current condition at the second branch. For instance, shutdown unit 56 may validate an over-current condition at the HSP branch based on a lack of over-current conditions at each of the other branches of bridge 40. The lack of over-current conditions may indicate a lack of validated over-current conditions and/or a lack of over-current conditions whether the over-current conditions are validated or not. In addition, shutdown unit 56 may validate or invalidate the over-current condition at the HSP branch based on the logical value of the data at data path 50. In other words, a logical zero may invalidate the over-current condition and a logical one may validate the over-current condition. Further details of shutdown unit 56 are described below in more detail with respect to FIG. 6.

In response to determining the over-current condition at the HSP branch is valid, shutdown unit 56 may send a signal over data path 46 to completely or partially open the switch associated with the HSP branch to prevent the detected over-current condition from adversely impacting the operation or functionality of driver unit 20 and related components. In addition to or rather than controlling the switch associated with the HSP branch, shutdown unit 56 may send a signal over data path 46 to increase the resistance of the load associated with the HSP branch to prevent the detected over-current condition from adversely impacting the operation or functionality of driver unit 20 and related components. Shutdown unit 56 may open the respective switch and/or increase the resistance of the respective load of each of the branches of bridge 40 where the data from detection unit 52 indicates a valid over-current condition exits.

In some examples, shutdown unit 56 may control a switch of a branch of bridge 40 in response to validating an over-current condition at the branch. For instance, in response to validating an over-current condition at the LSP branch of bridge 40, shutdown unit 56 may send a command or signal over data path 46 to open, close, or partially open or close, the switch associated with the LSP branch (and prevent the over-current condition from damaging driver unit 20). Further details of shutdown unit 56 are described below in more detail with respect to FIG. 6.

Figure 5:
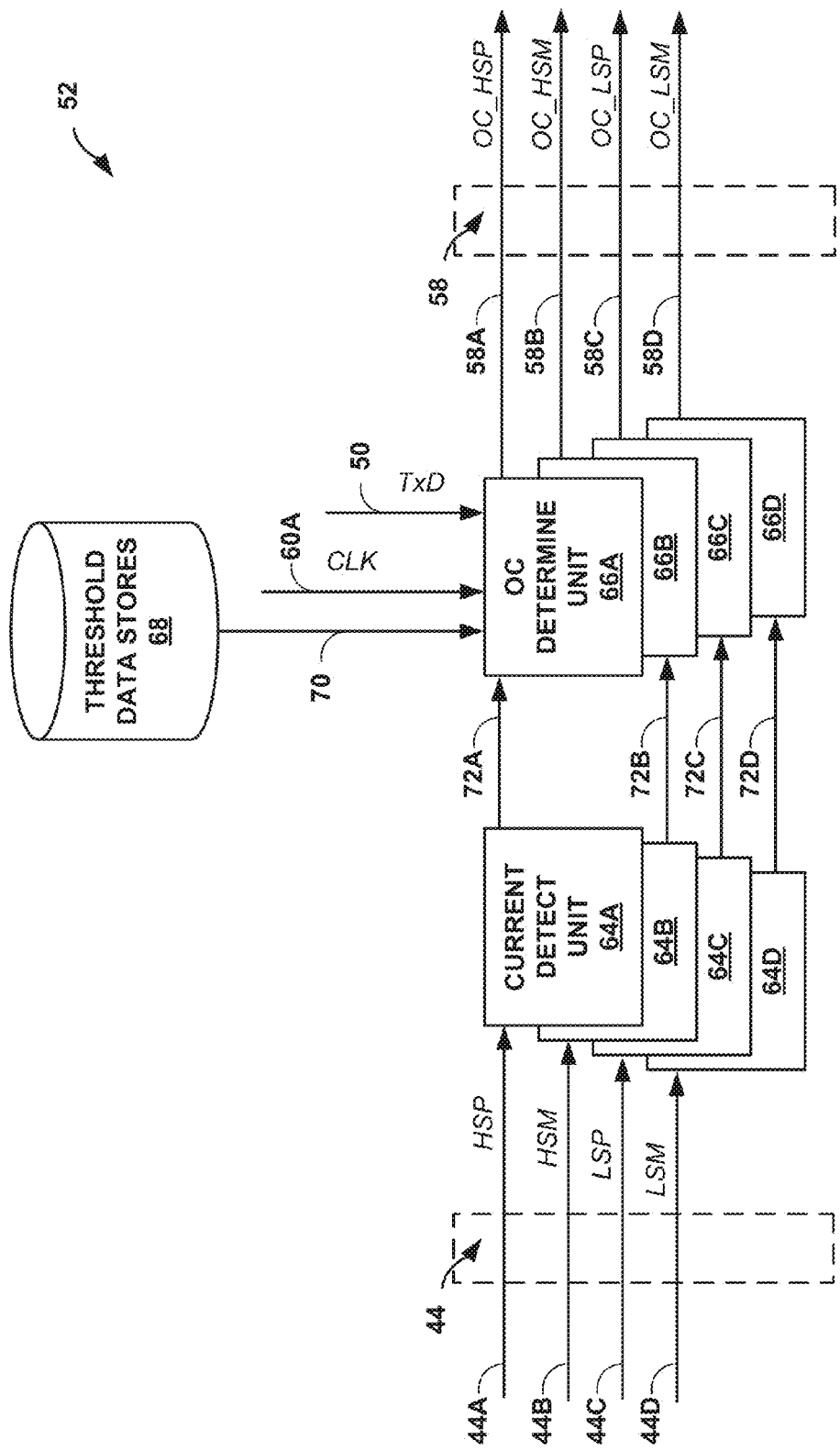
FIG. 5 is a conceptual diagram illustrating an example detection unit of the example over-current handler unit.

FIG. 5 is a conceptual diagram illustrating example detection unit 52 of example over-current handler unit 38 shown in FIG. 4. As described above with regard to FIG. 4, detection unit 52 may receive a transmit data signal as an input from data path 50, and may receive a clock signal as an input from data path 60A. Detection unit 52 may monitor and or measure the electrical state of each branch of bridge 40 based on information received over data path 44. In synch with the clock signal, and based on the information received over data path 44, detection unit 52 may perform over-current detection functionality at each of the branches of bridge 40. Detection unit 52 may output data over data path 58 that indicates whether an over-current condition exists at each of the branches of bridge 40.

Detection unit 52 includes current detect units 64A through 64D (collectively "current detect units 64"), over-current (OC) determine units 66A through 66D (collectively "OC determine units 66"), and threshold data stores 68. Units 64 and units 66 may be implemented by a combination of one or more of hardware, software and/or firmware. Threshold data stores 68 may store threshold information required for use during operation of detection unit 52 (e.g., detection unit 52 may store information corresponding to one or more threshold current values).

Threshold data stores 68, in some examples, may have the primary purpose of being a short term and not a long-term computer-readable storage medium. Threshold data stores 68 may comprise volatile memory and therefore not retain stored contents if powered off. Examples of volatile memories include random access memories (RAM), dynamic random access memories (DRAM), static random access memories (SRAM), and other forms of volatile memories known in the art. However, non-volatile FLASH memory or other types of volatile or non-volatile memory could also be used.

In some examples, OC determine units 66 may access information within threshold data stores 68 via data path 70. For instance, OC determine units 66 may send read commands via data path 70 to threshold data stores 68 to retrieve via data path 70 one or more current thresholds to determine whether an over-current exits at one or more of the branches of bridge 40.

Each of current detect units 64 may determine the current at a corresponding branch of bridge 40 based on the information received over data path 44. For example, data path 44 is shown in FIG. 5 as having four separate data paths or data paths 44A through 44D. Each one of data paths 44A, 44B, 44C, and 44D, correspond to a respective one of the four branches of bridge 40. Likewise, each one of current detect units corresponds to a respective one of the four branches of bridge 40. Each one of current detect units 64 can measure the current at a corresponding branch of bridge 40 based on the information received over a corresponding data path 44. Although not shown in FIG. 5, data path 60A also be coupled to each of current detect units 64 to synchronize the current detect functionality with a clock pulse of the clock signal generated by clock unit 54. Likewise, in some examples, current detect units 64 may continuously (e.g., asynchronously) monitor and detect the current at the branches of bridge 40.

Current detect unit 64A can measure the current at the HSM branch of bridge 40 based on the information received over data path 44A. Current detect unit 64B can measure the current at the HSP branch of bridge 40 based on the information received over data path 44B. Current detect unit 64C can measure the current at the LSM branch of bridge 40 based on the information received over data path 44C. Current detect unit 64D can measure the current at the LSP branch of bridge 40 based on the information received over data path 44D.

In some examples, current detect units 64 may determine a voltage across a resistor of a branch of bridge 40 and detect the current through the branch based at least in part on the voltage. For instance, current detect unit 64C may receive a voltage measurement from data path 44C. The voltage may correspond to the electrical potential across a load of the LSP branch of bridge 40. Current detect unit 64 may determine the current at the LSP branch as a ratio between the voltage and the resistance of the load.

Current detect units 64 may output the detected (i.e., measured) currents of the branches of bridge 40 over data paths 72A through 72D (collectively "data paths 72"). A corresponding one of OC determine units 66 can receive the detected current from a corresponding one of current detect units 64 via a corresponding data path 72.

Each of OC determine units 66 may determine whether an over-current condition exists at a corresponding branch of bridge 40 based on information received over data paths 72 from a corresponding current detect unit 64. For example, data path 58 is shown in FIG. 5 as having four separate data paths or data paths 58A through 58D. Each one of data paths 58A, 58B, 58C, and 58D, corresponds to a respective one of the four branches of bridge 40. Based on the detected currents received over data paths 72, each one of OC determine units 66 can determine whether an over-current condition exists at a corresponding branch of bridge 40 and output an indication of the over-current condition over a corresponding data path 58.

Each of OC determine units 66 may receive both the clock signal from data path 60A and the transmit data signal via data path 50. OC determine units 66 may synchronize over-current determination functions with pulses of the clock signal received via data path 60A. OC determine units 66 may determine whether over-current conditions exist at the branches of bridge 40 based at least in part on the logical value of the (TxD) data at data path 50. For instance, a particular value of current at a branch of bridge 40 when the logical value of the data at data path 50 may indicate an over-current condition whereas when the logical value of the data is a different value, the same particular current value at that branch may not indicate an over-current condition.

OC determine unit 66A can output data over data path 58A that indicates whether an over-current condition exists at the HSM branch of bridge 40. OC determine unit 66B can output data over data path 58B that indicates whether an over-current condition exists at the HSP branch of bridge 40. OC determine unit 66C can output data over data path 58C that indicates whether an over-current condition exists at the LSM branch of bridge 40. OC determine unit 66D can output data over data path 58D that indicates whether an over-current condition exists at the LSP branch of bridge 40.

In accordance with techniques of this disclosure, detection unit 52 may detect a current through at least one branch of a driver unit coupled to a bus for driving at least one signal line of the bus, detect a change in data at a transmit data input of the driver unit, and determine an over-current condition at the at least one branch based at least in part on the detected current and in response to the change. For example, OC determine unit 66A may receive information from current detect unit 64A that indicates a measurement of the current through the HSP branch of bridge 40. OC determine unit 66A may receive a clock signal over data path 60A that may cause OC determine unit 66A to determine whether an over-current condition exits at the HSP branch of bridge 40.

OC determine unit 66A may determine the logical value of the data at the transmit data input based on information received via data path 50. Based on the logical value of the data, OC determine unit 66A may retrieve a current threshold from threshold data stores 68 via data path 70. OC determine unit 66A may compare the current threshold to the measured current. If the current satisfies the current threshold, OC determine unit 66A may determine no over-current condition exits at the HSP branch. Otherwise (e.g., if the current does not satisfy the current threshold) OC determine unit 66A may determine that an over-current condition does exist at the HSP branch.

In some examples, detection unit 52 may determine a value of the data at the transmit data input and determine the over-current condition at a branch based at least in part on the value. For example, OC determine unit 66C may receive information about the current detected at the LSP branch of bridge 40 from current detect unit 64C. OC determine unit 66C may compare the current to a threshold from threshold data stores 68 and based on the comparison, determine whether an over-current condition exists.

OC determine unit 66C may utilize one particular threshold from threshold data stores 68 when the data at data path 50 represents a logical zero and a different threshold when the data represents a logical one. For instance, when the data at data path 50 represents a logical zero, and no over-current condition is present anywhere at bridge 40, OC determine unit 66C may expect a nominal current to be present at the LSP branch. Conversely, when the data at data path 50 represents a logical one, and no over-current condition is present anywhere at bridge 40, OC determine unit 66C may expect a near zero current to be present at the LSP branch. OC determine unit 66C may utilize a greater value threshold when the data represents a logical zero than the value of the threshold when the data represents a logical one. In other words, for a logical zero, if the current exceeds the nominal current OC determine unit 66C may detect an over-current condition at the LSP branch, and for a logical one, if a non-zero current is detected, OC determine unit 66C may determine an over-current condition at the LSP branch.

In some examples, the change in the data input that triggered clock unit 54 and detection unit 52 may be detected at a first point in time, and in response to determining a predetermined amount of time has elapsed since the first point in time, detection unit 52 may determine the over-current condition. In other words, detection unit 52 may delay determining whether an over-current condition exists at bridge 40 until a predetermined amount of time after a change in data at data path 50. In this way, detection unit 52 may not determine an over-current condition at bridge 40 based on noise (typically one or more signal spikes with a period of a fraction of a bit length) at bus 14. For example, the predetermined amount of time may be based on a bit length of the data at the transmit data input. In some examples, the predetermined amount of time is less than a bit length.

In some examples, the change may be a first change, the predetermined amount of time may be greater than a bit length of the data, and the over-current condition may be determined by detection unit 52 in response to determining the predetermined amount of time has elapsed since the first point in time and prior to detecting a second change in the data. In other words, clock unit 54 may generate a clock pulse at data path 60A in response to detecting a change in the data at data path 50. This clock pulse may cause detection unit 52 to determine whether an over-current condition exists at bridge 40. In order to detect an over-current event during a long constant data phase (e.g., a period of time when no change in the value of the data at the transmit data input occurs), clock unit 54 may automatically generate a clock pulse at data path 60A to cause detection unit 52 to determine whether an over-current condition exists at bridge 40 in response to determining the long constant data phase (e.g., in response to determining a predetermined amount of time has elapsed since the first point in time and prior to detecting a second change in the data).

OC determine units 66 may output information over data path 58 to shutdown unit 56 that indicates whether an over-current condition exists at a branch of bridge 40. Shutdown unit 56 may validate the over-current conditions determined by OC determine units 66 and control switches of the branches of bridge 40.

Figure 6:
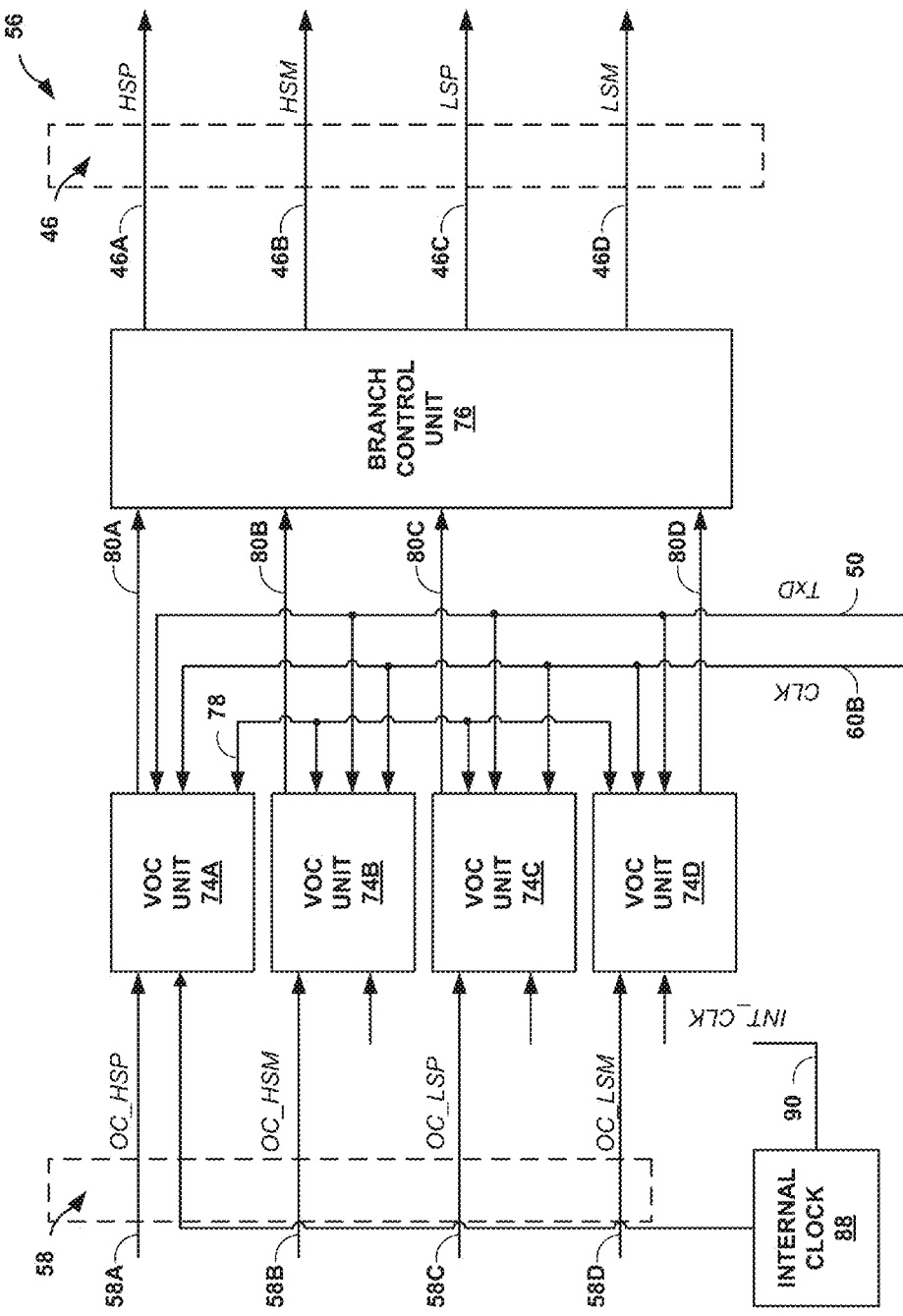
FIG. 6 is a conceptual diagram illustrating an example shutdown unit of the example over-current handler unit.

FIG. 6 is a conceptual diagram illustrating an example shutdown unit of the example over-current handler unit shown in FIG. 4. As described above with regard to FIG. 4, shutdown unit 56 may receive a transmit data signal as an input from data path 50, and may receive a clock signal as an input from data path 60B. Shutdown unit 56 may perform branch shutdown techniques on behalf of OC handler 38 to prevent and/or limit the impact and over-current condition may have on bus driver 20 and or components coupled to bus driver 20.

Shutdown unit 56 includes verify over-current (VOC) units 74A through 74D (collectively "VOC units 74") and branch control (BC) unit 76. VOC units 74 and BC unit 76 may be implemented as a combination of one or more of hardware, software and/or firmware. Shutdown unit 56 also includes internal clock 88.

Each of VOC units 74 is operatively coupled to BC unit 76 via a corresponding one of data paths 80A through 80D (collectively "data paths 80"). For instance. VOC unit 74A may transmit data to BC unit 76 via data path 80A. VOC units 74 may receive data from detection unit 52 via data path 58 to determine whether a valid over-current condition exists at one or more of the branches of bridge 40. Each of VOC units 74 may transmit and/or receive data with the other VOC units 74 via data path 78. Each of VOC units 74 may receive as input a clock signal generated by clock unit 54 via data path 60B and a transmit data signal via data path 50. In addition to the clock signal from clock unit 54, each of VOC units 74 may receive an internal clock signal generated by internal clock 88 via data path 90. BC unit 76 may output data over data path 46 to control and/or adjust the branch characteristics of bridge 40.

In accordance with techniques of this disclosure, shutdown unit 56 may detect an over-current condition at a first branch of a plurality of branches of a driver unit coupled to a bus for driving at least one signal line of the bus. Shutdown unit 56 may validate the over-current condition based at least in part on data at a transmit data input of the driver unit. In some examples, shutdown unit 56 may further validate the over-current condition in response to a change in the data at the transmit data input. Shutdown unit 56 may disable at least one branch of the plurality of branches in response to validating the over-current condition at the first branch.

For example, each of VOC units 74 may receive information transmitted from detection unit 52 over data path 58 that indicates whether an over-current condition is detected at a corresponding branch of bridge 40. Each of VOC units 74 may validate the over-current information received for a corresponding branch. In other words, rather than relying solely on an over-current condition determined by detection unit 52, VOC units 74 of shutdown unit 56 may first validate an over-current condition prior to shutting down, disabling, or otherwise adjusting a branch of bridge 40 in response to the over-current condition. After validating an over-current condition, VOC units 74 may then transmit data (e.g., one or more over-current flags) to BC unit 76 that indicates at which of the branches of bridge 40 over-current conditions exist. BC unit 76 may transmit commands over data path 46 to control at least one branch of bridge 40 to eliminate the over-current condition. In this way, a pre-mature adjustment (e.g., in response to noise on the bus that causes a false over-current condition) of one or more of the branches of bridge 40 may be prevented since only validated over-current conditions may cause shutdown unit 56 to adjust bridge 40.

Each of VOC units 74 may determine whether the information received over data path 58 is a valid indication of the electrical properties of the branches of bridge 40 based on information about the other branches received over data path 78 and the data at the transmit data input of driver unit 20 (e.g., data path 50). Each of VOC units 74 may be implemented as one or more finite state machines, look-up tables, and/or counters for validating an over-current condition. These finite state machines, lookup tables, and counters, may rely on the contextual information received from data paths 58, 78, 50, and 60B to evaluate and potentially validate an over-current condition.

For instance, VOC unit 74D may receive information over data path 58D that indicates an over-current condition is detected at the LSM branch of bridge 40. VOC unit 74D may receive an indication of the data at the transmit data input of bus driver 20 from data path 50. In addition, VOC unit 74D may receive information over data path 78 from each of the other VOC units 74B, 74C, and/or 74A about whether or not an over-current condition is detected at the other branches of bridge 40. One or more finite state machine and counters of VOC unit 74D may receive some or all this information and based on this information, predict whether the potential over-current condition is valid or not. VOC unit 74D may idle and not validate the over-current condition until clock pulse is detected at data path 60B based on a change in the data at the transmit data input (e.g., data path 50).

Upon detecting a clock pulse at data path 60B, VOC unit 74D may synchronize one or more internal state machines and/or counters with the rising edge of the clock signal received over data path 60B (e.g., the clock signal that clock unit 54 generates based on data changes detected at the transmit data input of driver unit 20). For instance, a rising or falling edge of the clock signal may reset one or more counters and/or may cause one or more of the finite state machines to restart at an initial state.

VOC unit 74D may determine whether the potential over-current condition at the HSP branch is valid or not based on the logical value of the data (e.g., logical zero or one) at the transmit data input. For example, the following table (Table 1) represents the expected information received via data paths 58 (e.g., columns "HSP", "LSP", "HSM", and "LSM") from detection unit 52 for a "Category of Short" (e.g., over-current condition) determined at bridge 40 based on the logical value of the data at data path 50 (e.g., the transmit data input).

Table 1 shows that, in general, during over-current conditions, valid over-current conditions at high side branches of bridge 40 occur during short to GND or −5V scenarios, while valid over-current conditions at low side branches of bridge 40 are expected during short to VCC. Table 1 further shows that, in general, a short circuit of BP to BM may not generate valid over-current conditions since bridge 40 may have a sufficiently high impedance consisting of a series connection of high side and low side switches. In case of Direct Power injection (DPI), over-current conditions may occur in both high side and low side branches, since DPI may alternate the polarity of bridge 40 at a rate in the range of one megahertz to one gigahertz.

TABLE 1

| Category of Short | Data@TxD 50 | HSP 58A | HSM 58B | LSP 58C | LSM 58D |
|---|---|---|---|---|---|
| BM to GND/−5 V | 0 | no | yes | no | no |
| BP to GND/−5 V | 0 | no | yes | no | no |
| BM to Vbat | 0 | no | no | yes | no |
| BP to Vbat | 0 | no | no | yes | no |
| BP to BM | 0 | no | no | no | no |
| DPI: BP/BM positive | 0 | no | no | yes | no |
| DPI: BP/BM negative | 0 | no | yes | no | no |
| BM to GND/−5 V | 1 | yes | no | no | no |
| BP to GND/−5 V | 1 | yes | no | no | no |
| BM to Vbat | 1 | no | no | no | yes |
| BP to Vbat | 1 | no | no | no | yes |
| BP to BM | 1 | no | no | no | no |
| DPI: BP/BM positive | 1 | no | no | no | yes |
| DPI: BP/BM negative | 1 | yes | no | no | no |

VOC unit 74D may include the information from table 1 in a look-up table and a clock pulse received over data path 60B may trigger VOC unit 74D to a finite state machine to determine whether the over-current condition at data path 58D is valid or not. In instances when the data at data path 50 is a logical zero, VOC unit 74D may determine that an over-current condition detected at the LSM branch of bridge 40 is not likely and determine that the corresponding over-current condition is not valid.

In some examples, after VOC unit 47D detects an over-current condition at the LSM branch at a first point in time. VOC unit 47D may detect a second over-current condition at the LSM branch at a second point in time subsequent to the first point. VOC unit 47D may validate the second over-current condition based at least in part on the data at the transmit data input. In response to validating the first and second over-current conditions at the LSM branch, VOC unit 47D may disable at least one branch of the plurality of branches.

In other words, to validate an over-current condition, each of VOC units 74 may require that the over-current condition be indicated at data path 58 for a predetermined amount of time without any inconsistencies. The predetermined amount of time may be, for example, a quantity of sequential internal clock pulses generated by internal clock 88. For instance, VOC unit 74D may include a counter that is synchronized with the clock signal at data path 60B. In response to a clock pulse received over data path 60B, and for each pulse of an internal clock signal generated by internal clock 88 and received over data path 90, VOC unit 74D may determine whether the over-current condition indicated at data path 58D is valid and if so, increment the counter for each pulse of the internal clock signal at data path 90.

By incrementing the counter with each internal clock pulse when the over-current condition is valid, the count within the counter represents the number of sequential internal clock cycles associated with an over-current condition at a corresponding branch of bridge 40. If the over-current condition is not valid for any one of the internal clock cycles. VOC unit 74D may reset the counter.

In some examples, if the counter reaches a threshold count (e.g., a maximum count), VOC unit 74D may validate the over-current condition by setting an over-current condition flag and outputting data indicating the flag across data path 80D to BC unit 76 that indicates to BC unit 76 that a valid over-current condition is detected at the LSM branch of bridge 40. Otherwise, if the counter never reaches the threshold count, VOC unit 74D may refrain from setting the over-current condition flag, and instead output information across data path 80D to BC unit 76 that indicates no valid over-current condition is detected at the LSM branch.

For example VOC unit 74D may determine that a first over-current condition detected at a first point in time (e.g., in response to a rising edge of the clock signal at data path 60) at the LSM branch is valid and increment a counter, but not set the over-current flag or transmit data to BC unit 76 indicating the over-current condition. VOC unit 74D may detect a second over-current condition at the LSM branch at a second point in time subsequent to the first point (e.g., after first, second, third, and subsequent internal clock pulses received over data path 90 from internal clock 88 since VOC unit 74 was triggered by the rising edge of the clock signal at data path 60B). VOC unit 74D may validate the second over-current condition based at least in part on the data at the transmit data input and increment the counter. If the counter satisfies the threshold count, VOC unit 74 may validate the over-current condition at the LSM branch, set the over-current condition flag for the LSM branch, and output data that indicates the valid over-current condition to BC unit 76. BC unit 76 may disable at least one branch of bridge 40 in response to receiving the indication of the validated over-current condition.

In some examples, the predetermined amount of time, and the value of the threshold count, may be based on a bit length of the data transmitted across bus 14. For instance, a message-based protocol may define a bit length for a data transmission across a shared bus (e.g., a length of time or period, such as one hundred nanoseconds, that a data signal may be asserted before the data indicated by the signal is determined by a node on the bus to represent a bit of data). The predetermined amount of time may represent a portion of that bit length (e.g., the predetermined amount of time may be less than the bit length), and as such, each of VOC units 74 may require that an over-current condition be present for the predetermined amount of time in order to be valid. The predetermined time may prevent VC units 74 from inadvertently validating an over-current condition based on short duration (e.g., one nanosecond) noise pulses.

In some examples, the counters of each of VC units 74 may be replaced or alternatively implemented using analog delay circuits. For instance, using an analog delay circuit, VC unit 74D may require that an over-current condition received via data path 58 to be indicated for the predetermined amount of time prior to outputting the over-current condition flag to BC unit 76.

VOC units 74 may output data to BC unit 76 over data paths 80A, 80B, 80C, and 80D that indicates whether a valid over-current condition exists at each of the branches of bridge 40. For example, BC unit 76 may receive a flag or other data via data path 80D that indicates whether an over-current condition exists at the LSM branch.

In response to receiving information about a validated over-current condition, BC unit 76 may disable at least one of the branches of bridge 40. For instance, BC unit 76 may send a command or signal across one of data paths 46 to adjust adjusting a position of a switch associated with at least one branch to at least partially open the switch. In some examples, BC unit 76 may at least partially open the switch associated with all of the branches of bridge 40 in response to any validated over-current condition. In some examples, BC unit 76 may at least partially open the switch associated with the branch where the over-current condition is detected.

In some examples, BC unit 76 may send a command or signal across one of data paths 46 to increase a resistance of a resistor associated with at least one branch. For instance, BC unit 76 may send a command or signal across one of data paths 46 to increase the resistance of a resistor associated with the branch where the over-current condition is detected.

Figure 7:
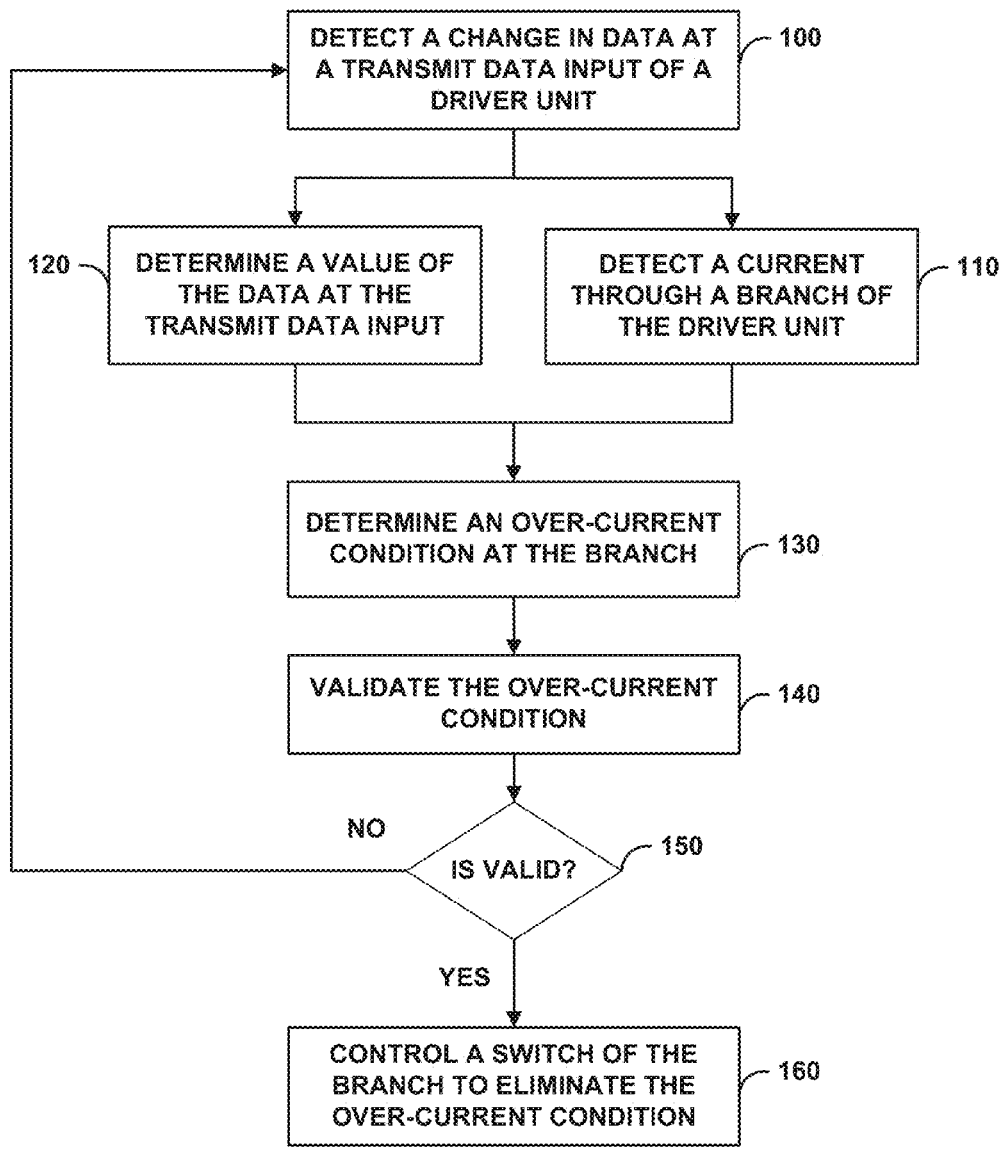
FIG. 7 is a flowchart illustrating example operations of the example driver unit, in accordance with one or more aspects of the present disclosure.

FIG. 7 is a flowchart illustrating example operations of driver unit 20 shown in FIG. 3, in accordance with one or more aspects of the present disclosure. FIG. 7 is described below within the context of OC handler unit 38 of FIG. 4, including shutdown unit 56 and detection unit 52.

OC handler unit 38 may detect a change in data at a transmit data input of driver unit 20 (100). For instance, clock unit 54 of OC handler unit 38 may detect a change in the data at data path 50 as the data changes from a logical one to a logical zero. In response to the change, clock unit 54 may transmit a clock pulse over data paths 60A, 60B to detection unit 52 and shut down unit 56.

In response to the change. OC handler unit 38 may determine a value of the data at the transmit data input (120) and detect a current through a branch of the driver unit 20 (130). For example, detection unit 52 may determine the value of the data at transmit data input 20 and based on the value, compare the current at each branch of bridge 40 to a respective threshold corresponding to the value and the branch.

OC handler unit 38 may determine an over-current condition at the branch (140). For instance, based on the comparison to the current at each branch of bridge 40 and a respective threshold based on the data at the transmit data input, detection unit 52 may determine an over-current condition at one or more of the branches of bridge 40.

OC handler unit 38 may validate the over-current condition (140). For example, detection unit 52 may send information over data path 58 to shutdown unit 56. At a predetermined time after receiving the clock signal via data path 60B, shutdown unit 56 may validate the information received over data path 58 and determine whether a valid over-current condition is at one or more of the branches of bridge 40 or if, for example, any of the potential over-current conditions indicated by detection unit 52 are actually noise.

OC handler unit 38 may determine whether the over-current condition is valid (150). If an over-current condition is valid, OC handler unit 38 may control a switch of the corresponding branch to eliminate the over-current condition (160). For instance, OC handler unit 38 may send a control signal and/or commands to bridge 40 to at least partially open a switch associated with one or more of the branches of bridge 40 and prevent the valid over-current condition from damaging driver unit 20.

Figure 8:
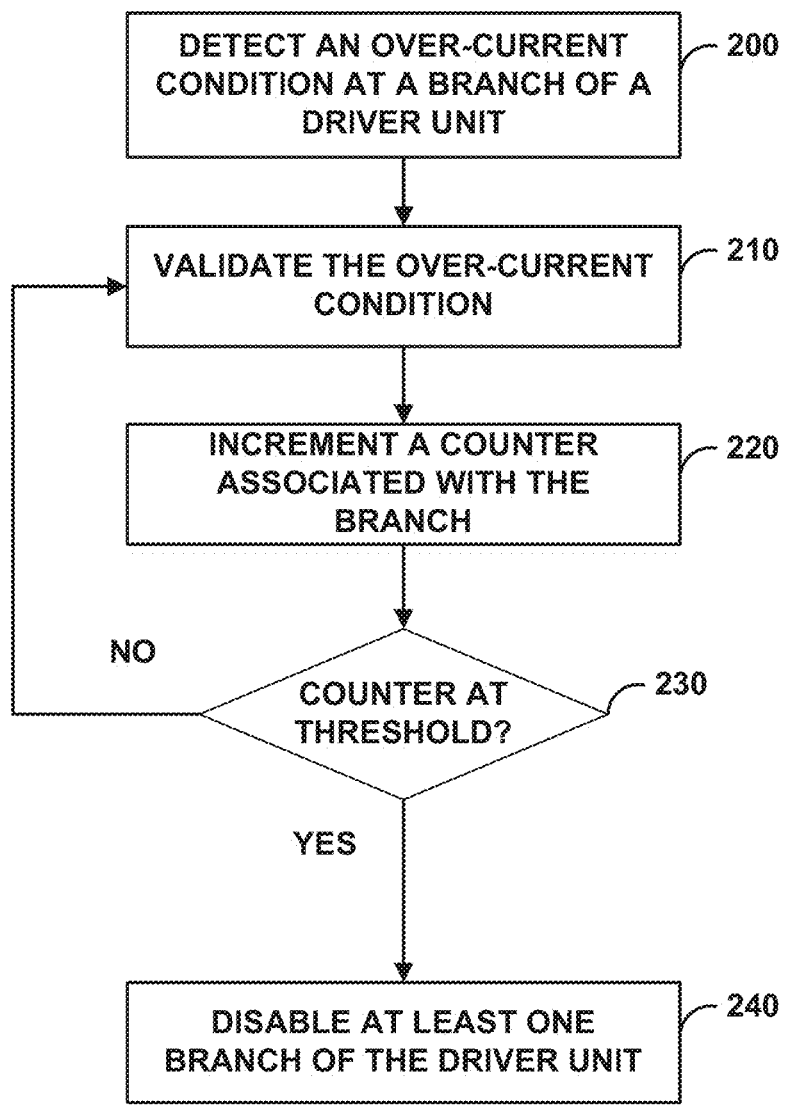
FIG. 8 is a flowchart illustrating further operations of the example driver unit, in accordance with one or more aspects of the present disclosure.

FIG. 8 is a flowchart illustrating further operations of driver unit 20 shown in FIG. 3, in accordance with one or more aspects of the present disclosure. FIG. 8 is described below within the context of OC handler unit 38 of FIG. 4, including shutdown unit 56 and detection unit 52.

Clock unit 54 of OC handler unit 38 may detect a change in the data at data path 50 as the data changes from a logical zero to a logical one. In response to the change, clock unit 54 may transmit a clock pulse over data paths 60A, 60B to detection unit 52 and shut down unit 56. In response to the change, OC handler unit 38 may detect an over-current condition at a branch of driver unit 20 (200). For instance, based on a comparison to a current at each branch of bridge 40 and a respective threshold based on the data at the transmit data input, detection unit 52 may determine an over-current condition at one or more of the branches of bridge 40.

OC handler unit 38 may validate the over-current condition (210). For example, detection unit 52 may send information over data path 58 to shutdown unit 56. At a predetermined time after receiving the clock signal via data path 60B, shutdown unit 56 may validate the information received over data path 58 and determine whether a valid over-current condition is at one or more of the branches of bridge 40 or if, for example, any of the potential over-current conditions indicated by detection unit 52 are actually noise.

OC handler unit 38 may increment a counter associated with the branch (220). For instance, upon determining a valid over-current condition at one or more of the branches of bridge 40, shutdown unit 56 may increment a counter to count a quantity of internal clock pulses that have occurred since first determining a valid over-current condition at a branch. The count stored within the counter may indicate a quantity of time that the over-current condition has been detected and has been determined valid. If at any time shutdown unit 56 determines the over-current condition is not valid, shutdown unit 56 may reset the counter. In this way, shutdown unit 56 may require an over-current condition to be detected continuously for a minimum period of time before shutdown unit 56 validates an over-current condition.

OC handler unit 38 may determine whether the count of the counter is at a threshold count (230). If the counter is not at the threshold, OC handler unit 38 may repeat steps 210 through 230. Otherwise, if the counter is at the threshold, OC handler unit 38 may validate the over-current condition.

In response to validating the over-current condition, OC handler unit 38 may disable at least one branch of driver unit 20 (240). For instance, OC handler unit 38 may send a control signal and/or commands to bridge 40 to at least partially open a switch associated with one or more of the branches of bridge 40 and prevent the valid over-current condition from damaging driver unit 20.

FIGS. 9A-15B are conceptual diagrams illustrating example current flows through an H-bridge circuit of the example driver unit. Each of FIGS. 9A-15B show 4 branches of an H-bridge circuit of a driver unit, such as bridge 40 of driver unit 20. FIGS. 9A-15B are each described below within the context of driver unit 20, OC handler unit 38, and bridge 40 of FIG. 4. The arrow in each of the FIGS. 9A-15B indicates the current flow or lack of current flow through the branches of bridge 40. The data in table 1 described above may be based at least in part on following current flow examples.

Figure 9A:
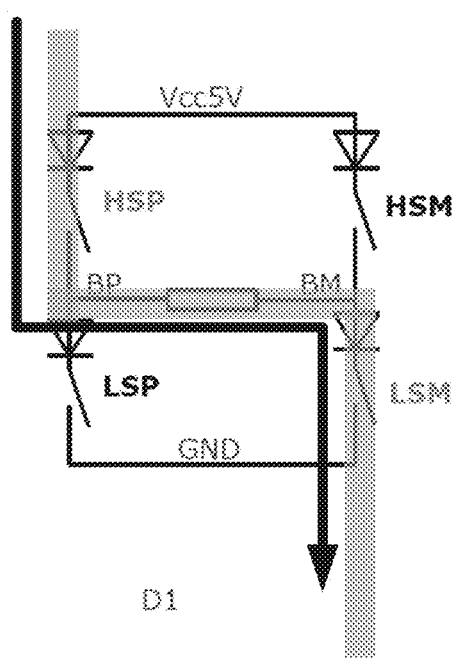
FIGS. 9-15 are conceptual diagrams illustrating example current flows through an H-bridge circuit of the example driver unit.
Figure 9B:
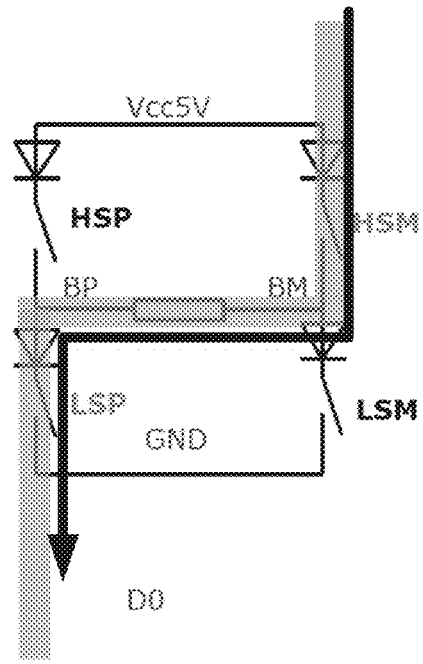

FIGS. 9A-15B and the data of Table 1 illustrate that any failure or over-current condition that OC handler unit 38 may determine and handle repeatable over-current conditions and determine repeatable over-current condition data (e.g., flags) based on the currents at one or both of the switches of the high side branches HSP and HSM or in one or both of the switches in the low side branches LSP and LSM. In addition, OC handler unit 38 may base over-current conditions on whether the data at the transmit data input (e.g., data path 50) represents a logical zero or a logical one. In addition, OC handler unit 38 may determine over-current conditions and represent the over-current conditions as over-current data for all short circuit scenarios which may be either purely high side related or purely low side related FIGS. 9A and 9B show nominal current flows through bridge 40 when no over-current condition exists at bus 14. FIG. 9A shows the current flow when the data at the transmit data input of driver unit 20 represents a logical one. FIG. 9B shows the current flow when the data at the transmit data input of driver unit 20 represents a logical zero. FIGS. 9A and 9B show that in response to a change in data at data path 50 (e.g. from a logical zero to a logical one or a logical one to a logical zero), OC handler unit 38 may determine no over current condition exists at either of the four branches of bridge 40.

Figure 10A:
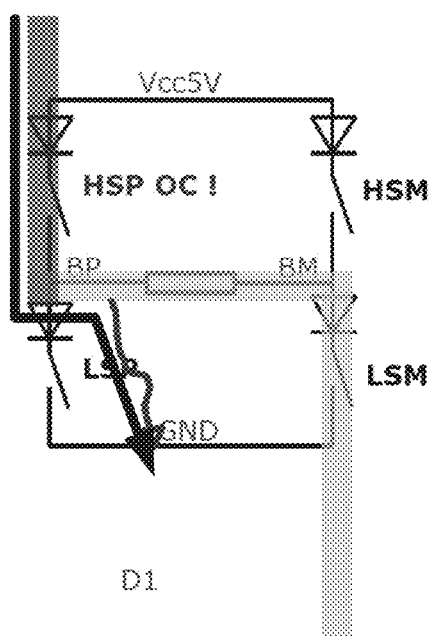
Figure 10B:
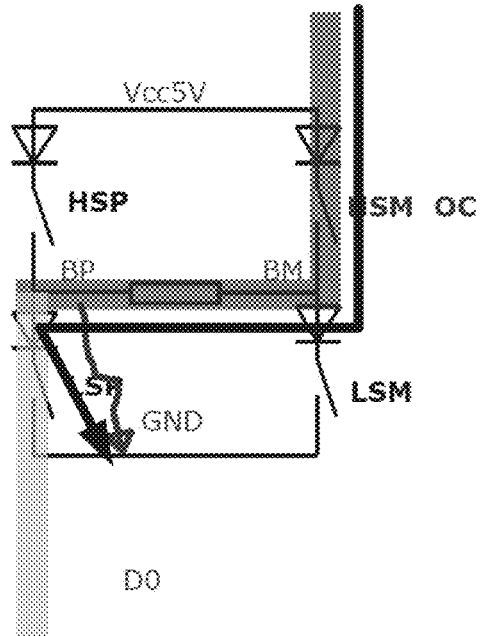

FIGS. 10A and 10B show over-current conditions occurring at the HSP branch and HSM branch of bridge 40 when the data at the transmit data input of driver unit 20 represents a logical one and a logical zero respectively. FIGS. 10A and 10B show that in response to a change in data at data path 50 from a logical zero to a logical one or a from a logical one to a logical zero, OC handler unit 38 may determine an over-current condition exists at either, respectively, the HSP branch or the HSM branch of bridge 40. OC handler unit 38 may validate these over-current conditions based on a lack of current detected at the LSM branch or the LSP branch respectively.

Figure 11A:
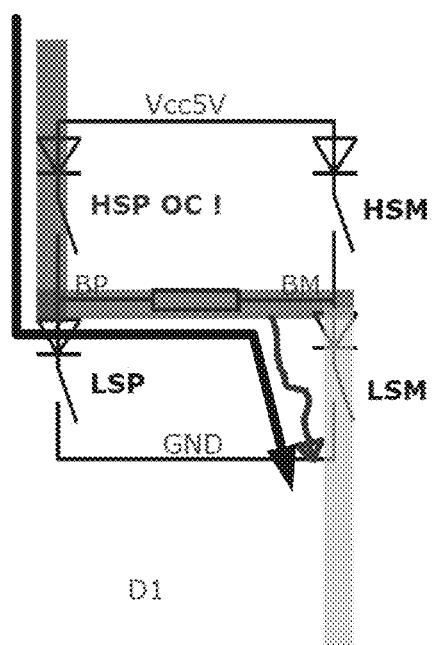
Figure 11B:
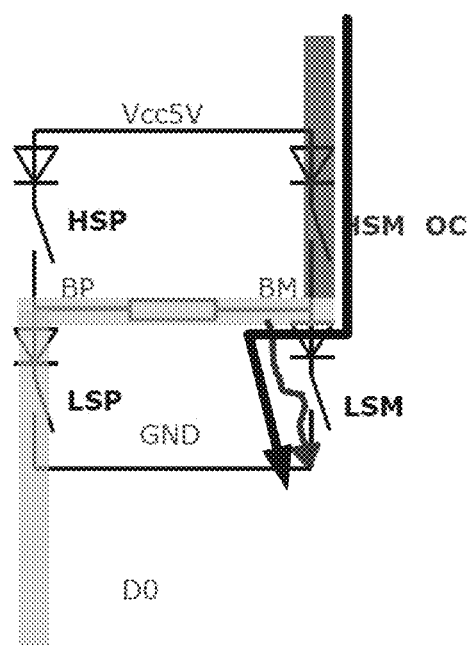

FIGS. 11A and 11B show over-current conditions occurring at the HSP branch and HSM branch of bridge 40 when the data at the transmit data input of driver unit 20 represents a logical one and a logical zero respectively. FIGS. 11A and 11B show that in response to a change in data at data path 50 from a logical zero to a logical one or a from a logical one to a logical zero, OC handler unit 38 may determine an over-current condition exists at either, respectively, the HSP branch or the HSM branch of bridge 40. OC handler unit 38 may validate these over-current conditions based on a lack of current detected at the LSM branch or the LSP branch respectively.

Figures 12A, 12B:
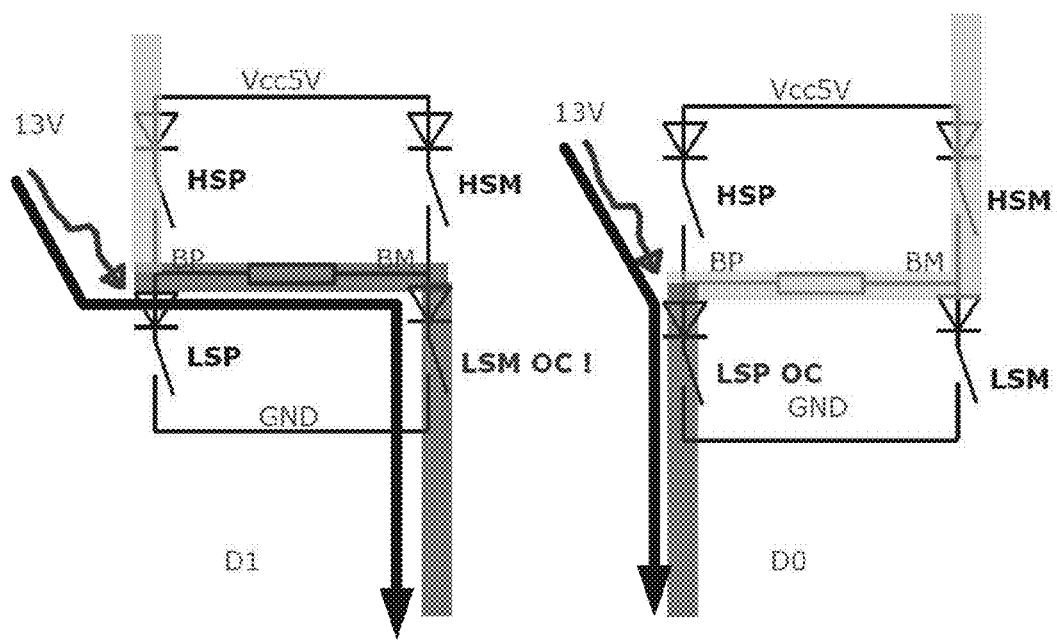

FIGS. 12A and 12B show over-current conditions occurring at the LSM branch and LSP branch of bridge 40 when the data at the transmit data input of driver unit 20 represents a logical one and a logical zero respectively. The over-current conditions in these examples may be caused by a coupling effect from an external voltage source. FIGS. 12A and 12B show that in response to a change in data at data path 50 from a logical zero to a logical one or a from a logical one to a logical zero, OC handler unit 38 may determine an over-current condition exists at either, respectively, the LSM branch or the LSP branch of bridge 40. OC handler unit 38 may validate these over-current conditions based on a lack of current detected at the HSP branch or the HSM branch respectively.

Figure 13A:
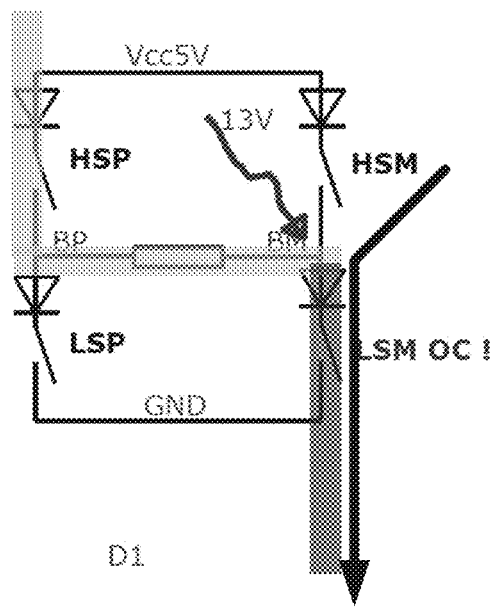
Figure 13B:
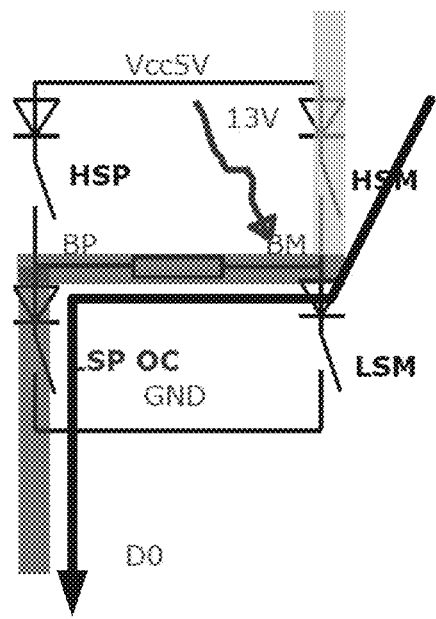

FIGS. 13A and 13B show over-current conditions occurring at the LSM branch and LSP branch of bridge 40 when the data at the transmit data input of driver unit 20 represents a logical one and a logical zero respectively. The over-current conditions in these examples may be caused by a coupling effect from an external voltage source. FIGS. 13A and 13B show that in response to a change in data at data path 50 from a logical zero to a logical one or a from a logical one to a logical zero, OC handler unit 38 may determine an over-current condition exists at either, respectively, the LSM branch or the LSP branch of bridge 40. OC handler unit 38 may validate these over-current conditions based on a lack of current detected at the HSP branch or the HSM branch respectively.

Figure 14A:
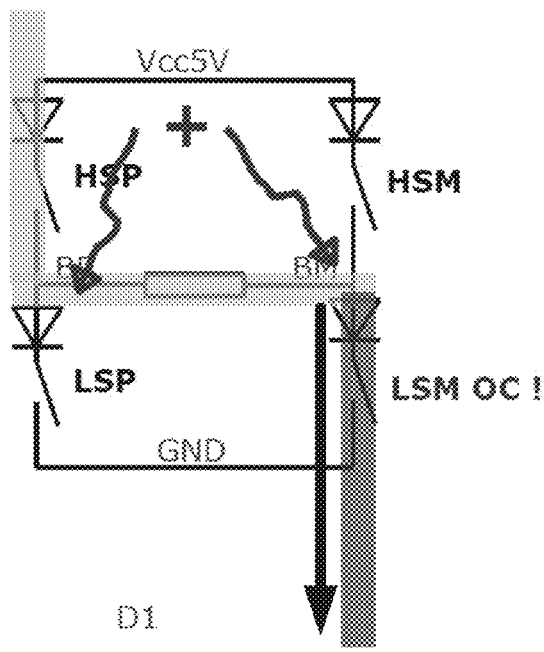
Figure 14B:
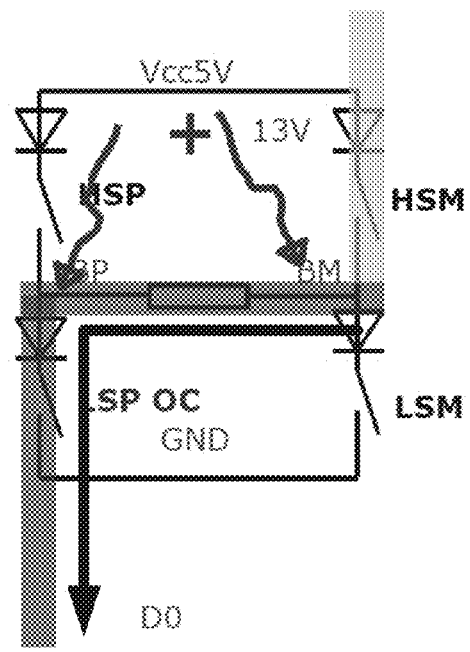

FIGS. 14A and 14B show over-current conditions occurring at the LSM branch and LSP branch of bridge 40 when the data at the transmit data input of driver unit 20 represents a logical one and a logical zero respectively. The over-current conditions in these examples may be caused by a coupling effect from an external voltage source. FIGS. 14A and 14B show that in response to a change in data at data path 50 from a logical zero to a logical one or a from a logical one to a logical zero, OC handler unit 38 may determine an over-current condition exists at either, respectively, the LSM branch or the LSP branch of bridge 40. OC handler unit 38 may validate these over-current conditions based on a lack of current detected at the HSP branch or the HSM branch respectively.

Figure 15A:
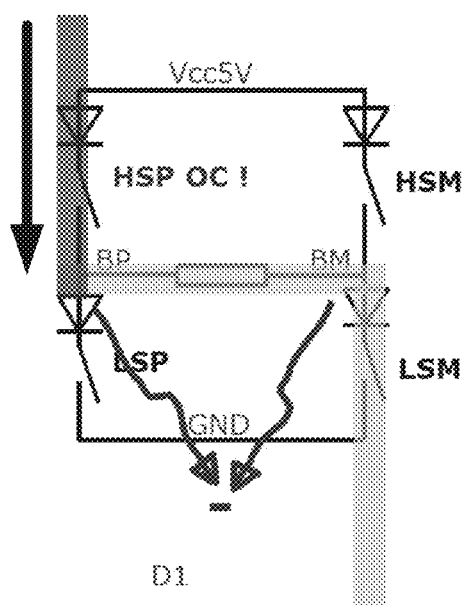
Figure 15B:
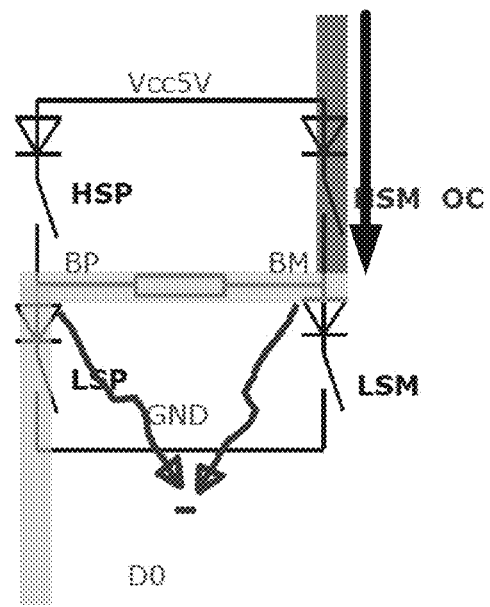

FIGS. 15A and 15B show over-current conditions occurring at the HSP branch and HSM branch of bridge 40 when the data at the transmit data input of driver unit 20 represents a logical one and a logical zero respectively. The over-current conditions in these examples may be caused by a coupling effect from an external voltage source or ground. FIGS. 15A and 15B show that in response to a change in data at data path 50 from a logical zero to a logical one or a from a logical one to a logical zero, OC handler unit 38 may determine an over-current condition exists at either, respectively, the HSP branch or the HSM branch of bridge 40. OC handler unit 38 may validate these over-current conditions based on a lack of current detected at the LSM branch and the LSP branch respectively.

FIGS. 16-25 are timing diagrams illustrating example operations of the example driver unit, in accordance with one or more aspects of the present disclosure. FIGS. 16-25 are each described below within the context of ECU 12A and driver unit 20 of FIG. 2 and driver unit 20, OC handler unit 38, and bridge 40 of FIG. 4. Each of FIGS. 16-25 illustrate the value of the data over time at the various data paths of OC handler unit 38 and driver unit 20 as OC handler unit 38 determines, validates and handles an over-current condition and bridge 40. Each of FIGS. 16-25 illustrate the state of the data or signal at data path 50, bus 14, data path 58, and data path 60A, 60B, and data path 90.

FIGS. 16-25 illustrate only relative timing sequences and are not in any way exact comparisons of the data across the various signal lines over time. For instance, clock pulses shown at data path 90 will in some examples have a much greater frequency (e.g., more pulses per horizontal area) than that shown.

The timing sequences shown in FIGS. 16-25 illustrate that OC handler unit 38 and driver unit 20 may perform operations relative to special timing considerations. For example, the data at the transmit data input (TxD) may appear at data path 50 with a delay of td1 (e.g., 20 ns) from the time that communication controller unit 22 sends the data over data path 26. Driver unit 20 may include an internal low pass filter between the branches of bridge 40 and OC handler unit 38. The delay caused by this low pass filter may be a delay of td2 (e.g., 15 ns). The overcurrent comparator (e.g., detection unit 52) may detect an overcurrent event with a delay of td3, however the delay may depend on a type of comparator used. For instance, for a non-sampling comparator, td3 may be 5-10 ns, for a sampled comparator, an additional delay may be present based on the synchronization that occurs with a clock signal. However, clock unit 54 may compensate for this additional delay since the clock generated by clock unit 54 is based on the data at the transmit data input, as such, statistical jitter of the sampling clock used by detection unit 52 may be minimized, relative to the data changing at the bus. In addition to these timing delays that may be introduced, a digital processing unit, such as shutdown unit 56 within OC handler unit 38, may introduce further delay due to data synchronization that may occur from the time when shutdown unit 56 first receives a signal to the time after shutdown unit 56 processes the signal. If internal clock 88 of shutdown unit 56 uses a clock which is at the same time a reference clock for the (slower) sampling clock, this component can be treated as a deterministic constant delay as well. As a result, any delay in detecting and handling an over-current condition with reference to when the data at the transmit data input changes can be predetermined. Driver unit 20 can compensate for the predetermined delay after the change of the data at the transmit data input and perform over-current (e.g., error) detection within a single-minimal bit length.

Figure 16:
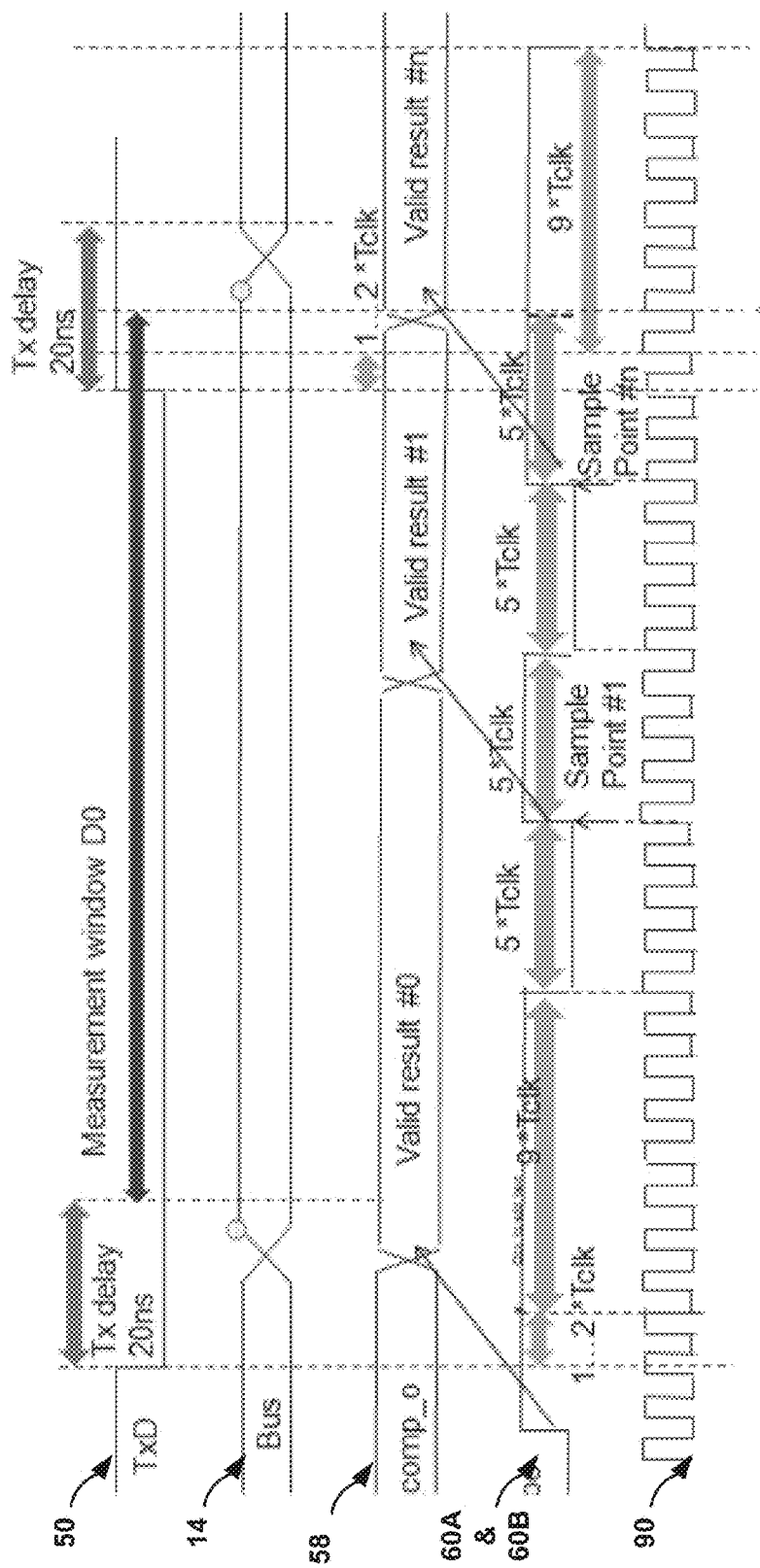
FIGS. 16-25 are timing diagrams illustrating example operations of the example driver unit, in accordance with one or more aspects of the present disclosure.

FIG. 16 show that after a change in the data at the transmit data input of driver 20, there is some delay before clock unit 54 can generate the clock signal at data paths 60A and 6B. The first rising edge of the clock signal at data paths 60A and 60B, subsequent to the first change in the data at the transmit data input is labled as sample point #1. Sample point #1 represents the start of OC handler unit 38 determining and validating any over-current condition that may be detected at bridge 40.

Figure 17:
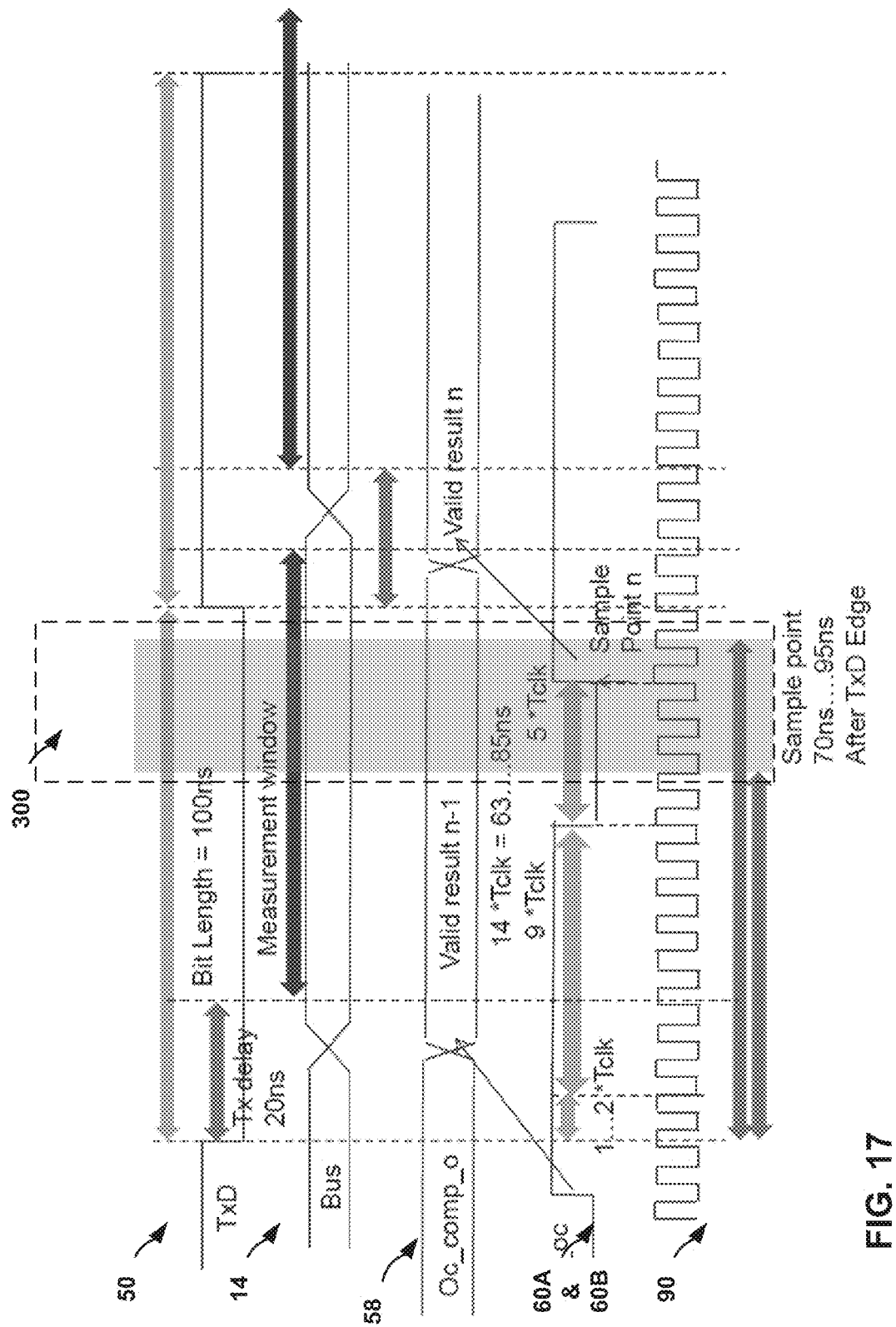

FIG. 17 shows that, when the bit length of the data at bus 14 is 100 ns, and after a change in the data at the transmit data input of driver 20, there may be a very specific time window 300 for OC handler unit 38 to validate a detected over-current condition and further, to adjust and/or control at least one branch of bridge 40 based on the validation.

Figure 18:
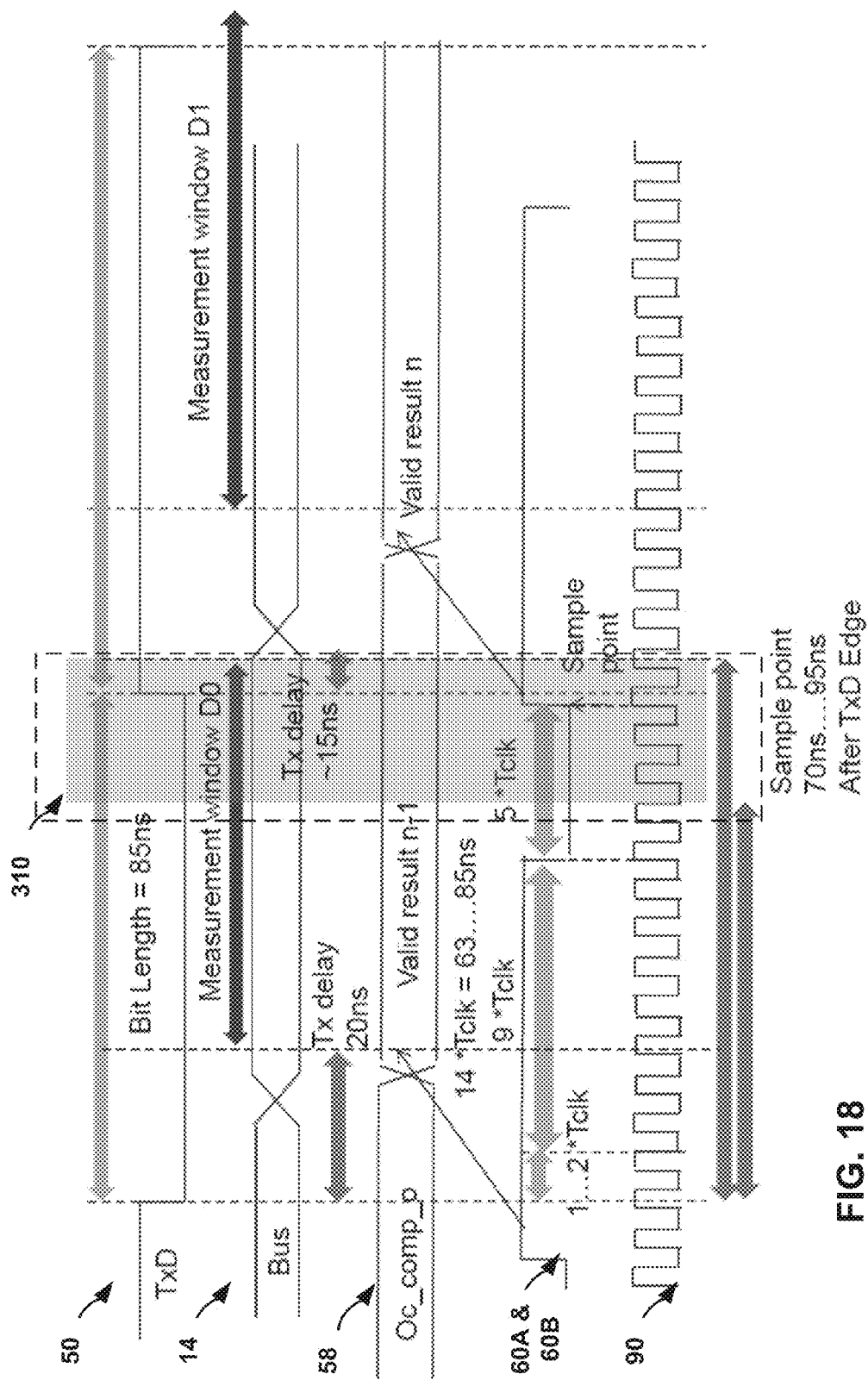

FIG. 18 shows that when the bit length of the data at bus 14 is 85 ns, and after a change in the data at the transmit data input of driver 20, there may be a very specific time window 310 (shorter than window 300 of FIG. 17) for OC handler unit 38 to validate a detected over-current condition and further, to adjust and/or control at least one branch of bridge 40 based on the validation.

Figure 19:
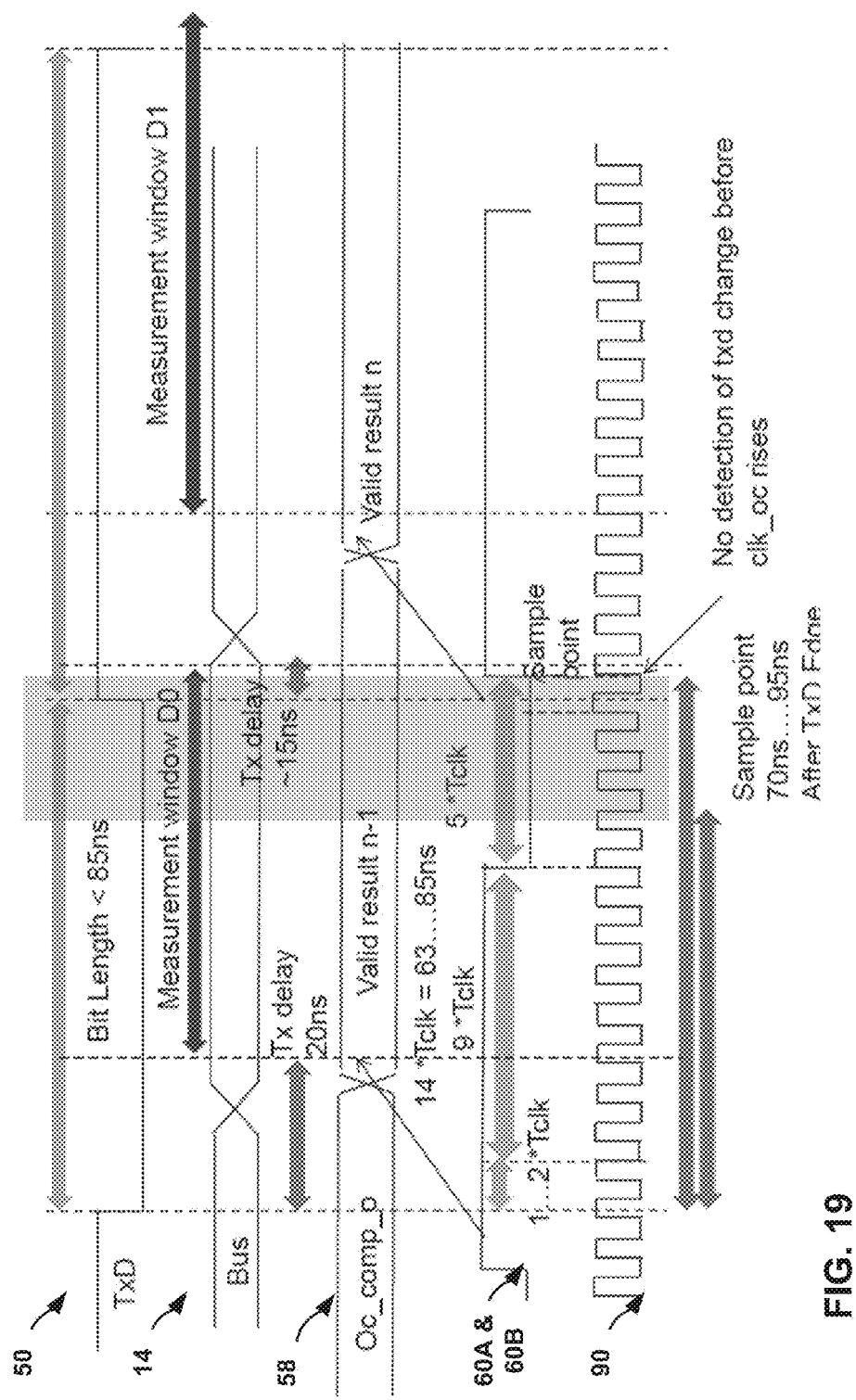

FIG. 19 shows a timing sequence that, in the case when a periodic bit sequence at bus 14 with short bit lengths (e.g., 85 ns), the sample point for determining an over-current condition may occur at less than 10 ns after the change in the transmit data input.

Figure 20:
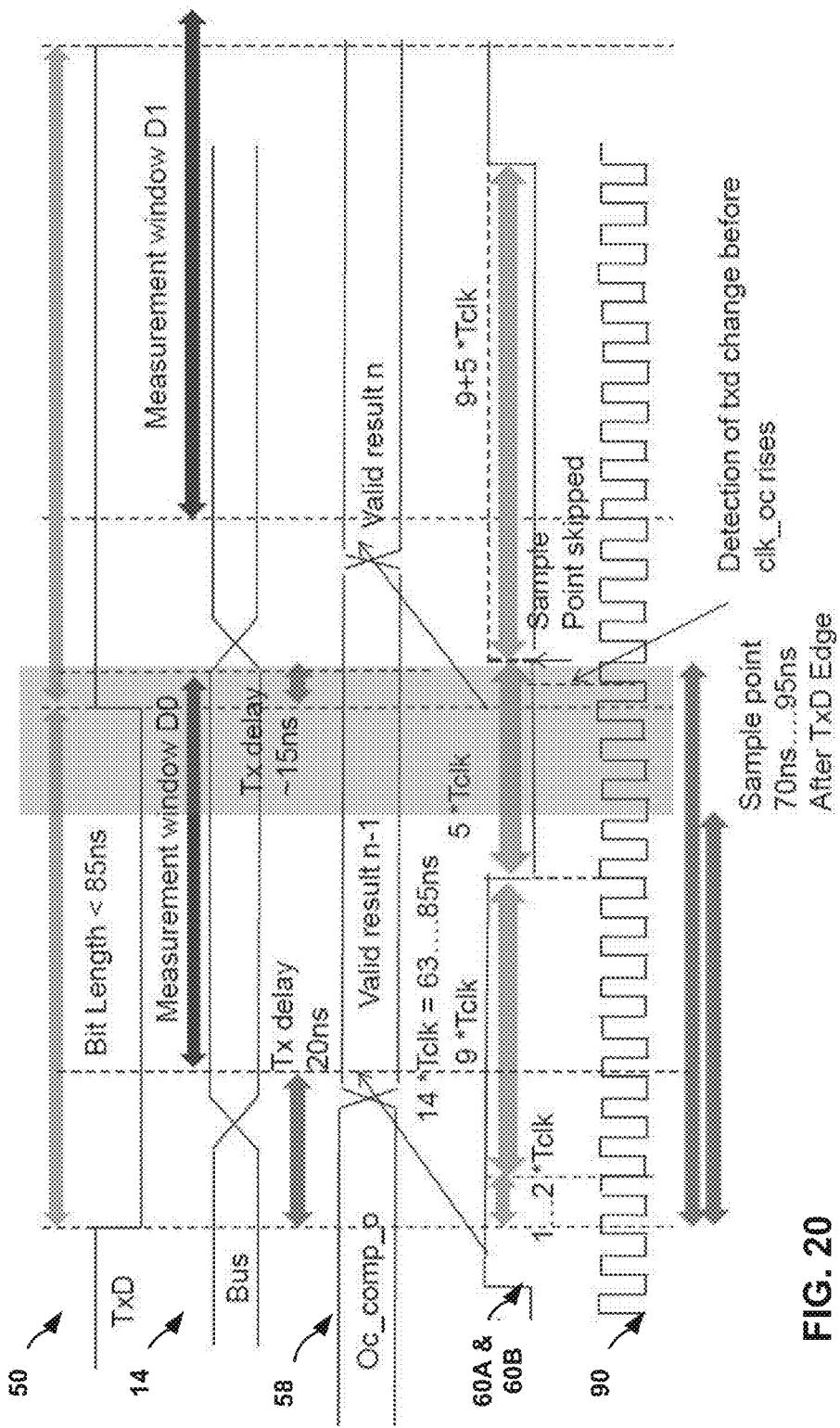

FIG. 20 shows a timing sequence that, in the case when a periodic bit sequence at bus 14 has too short of a bit length, the sample point that occurs at greater than 10 ns after the change at the transmit data input is skipped and no over-current detection may occur.

Figure 21:
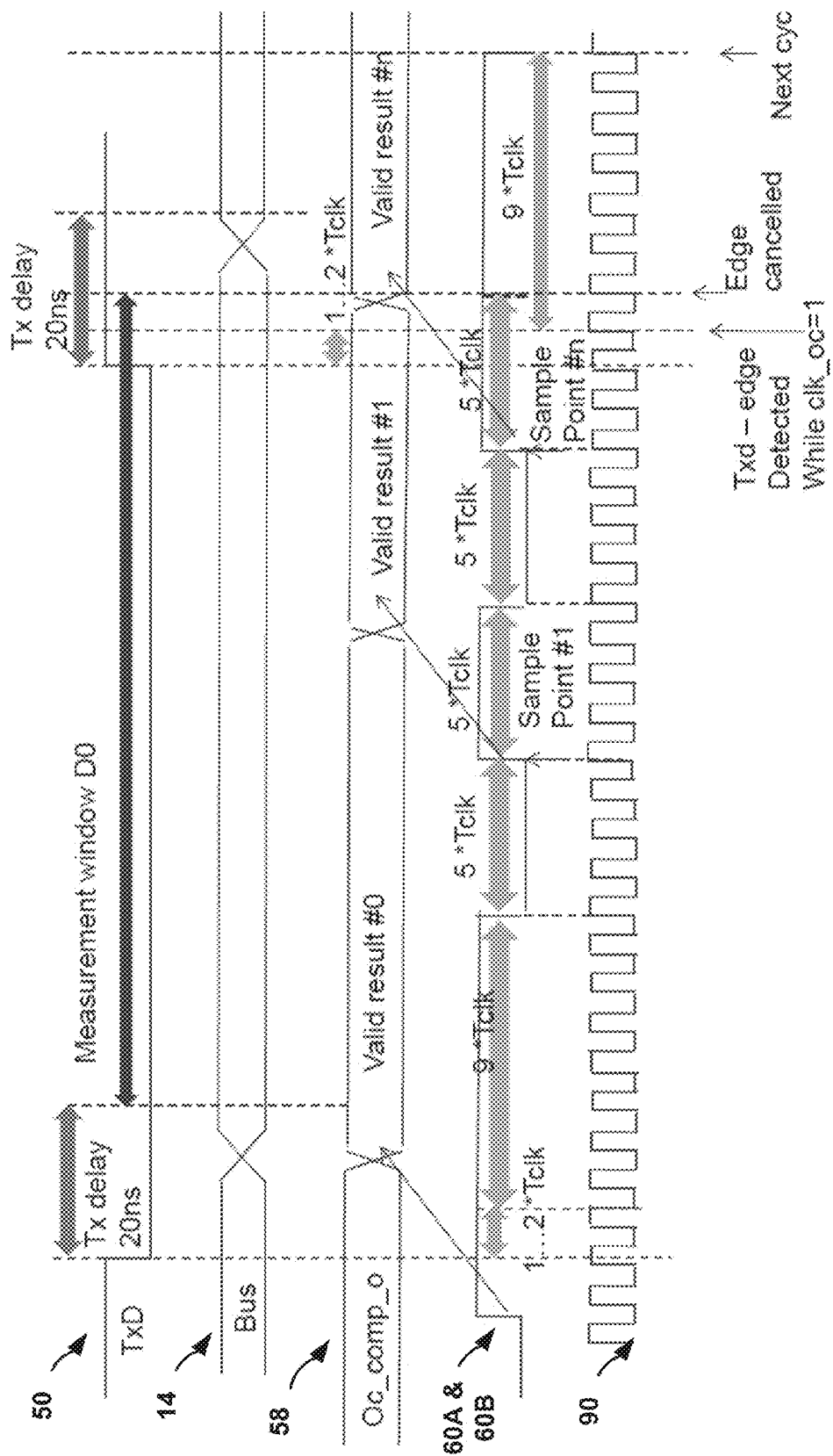

FIG. 21 shows a timing sequence that, in the case when a long constant bit sequence occurs at bus 14 (e.g., no change in the value of the data at the transmit data input), clock unit 54 may automatically generate additional, periodic, clock pulses at data paths 60A and 60B even though no actual change in the data occurs.

Figure 22:
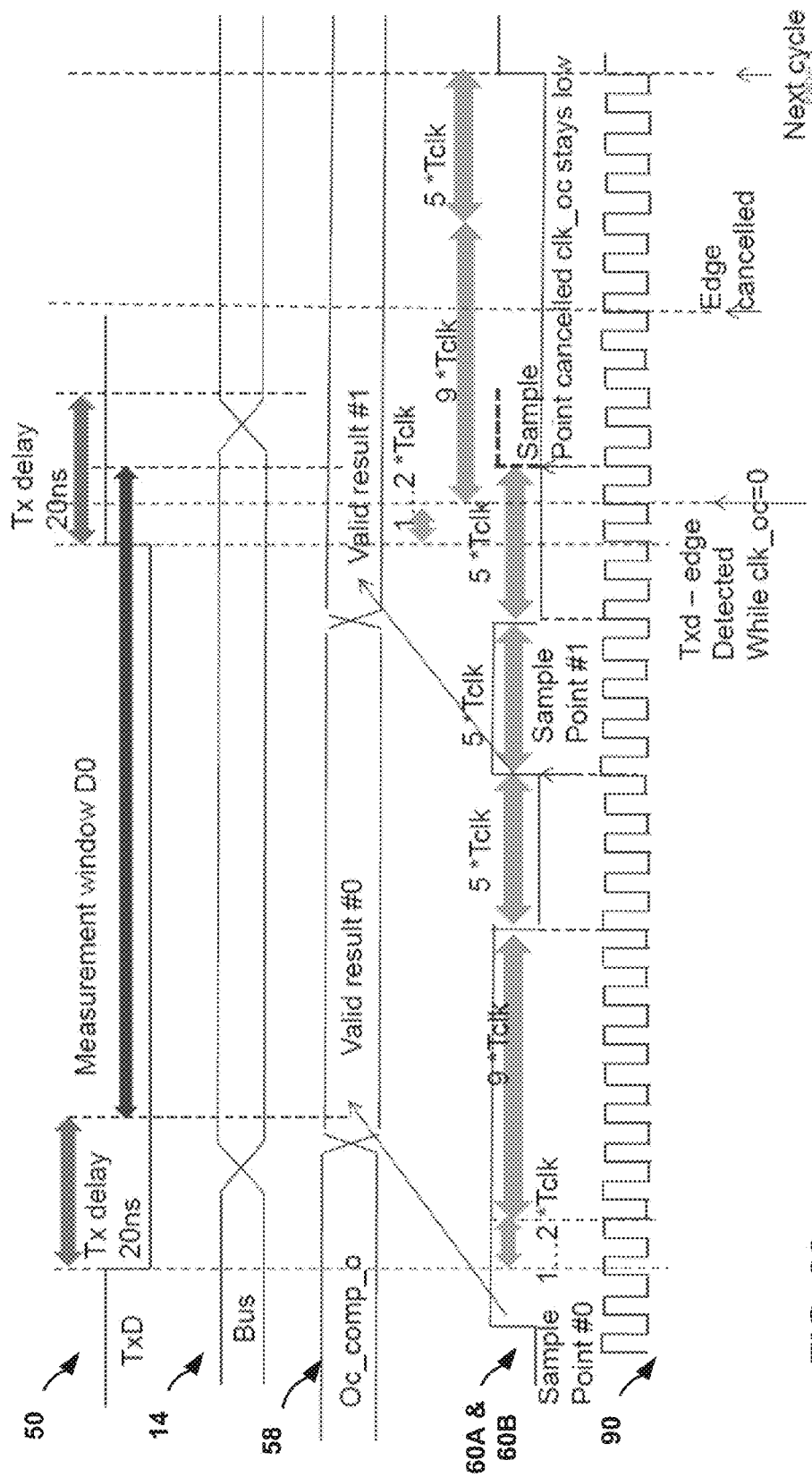

FIG. 22 shows a timing sequence that, in the case when a long constant bit sequence occurs at bus 14 (e.g., no change in the value of the data at the transmit data input), clock unit 54 may automatically generate additional clock pulses at data paths 60A and 60B even though no actual change in the data occurs. FIG. 22 further shows that when a change does occur at the transmit data input, and the clock signal at data paths 60A and 60B is low (e.g., a logical zero) clock unit 54 may cancel the automatic periodic clock signal at data paths 60A and 60B.

Figure 23:
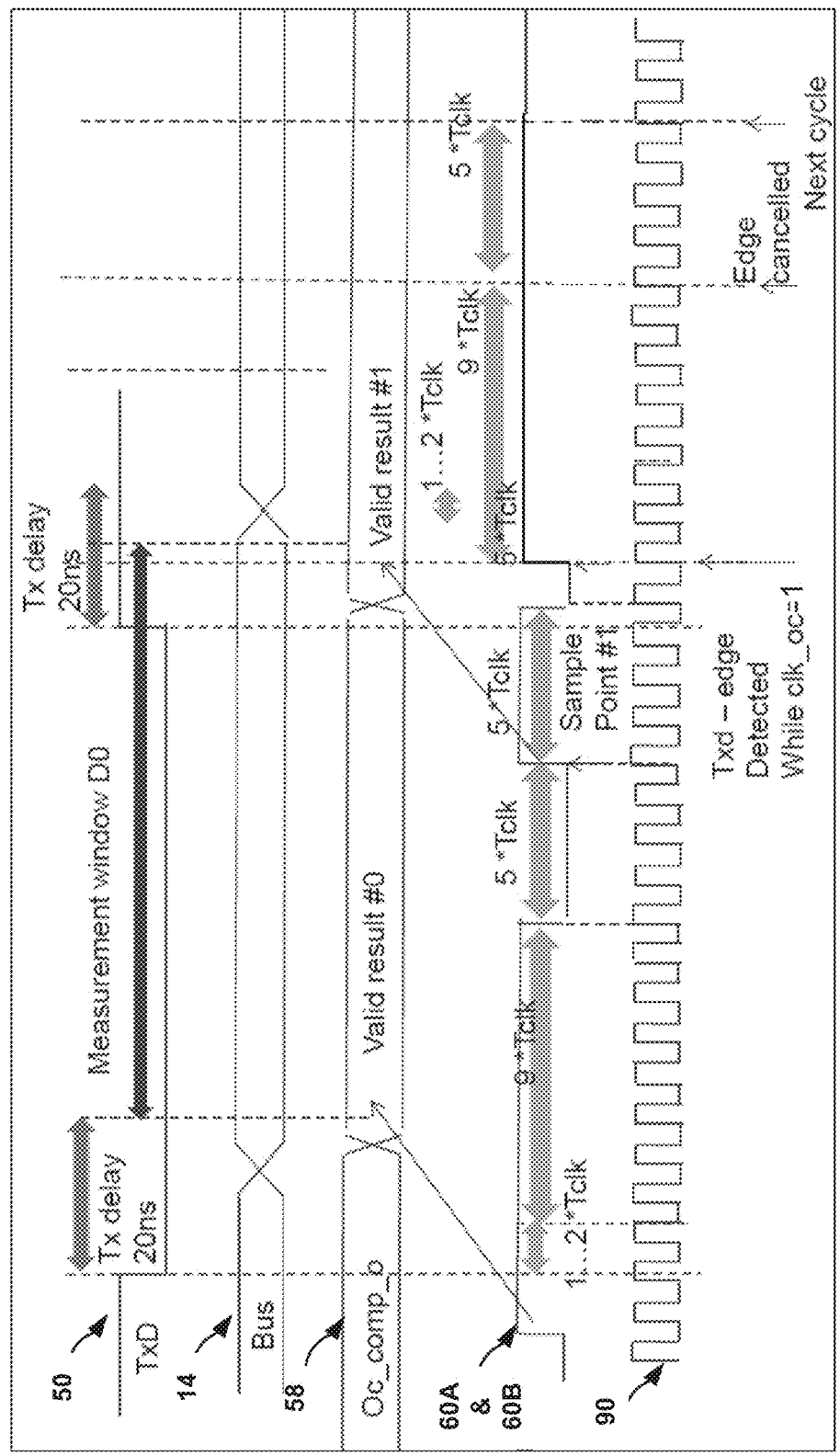

FIG. 23 shows a timing sequence that, in the case when a long constant bit sequence occurs at bus 14 (e.g., no change in the value of the data at the transmit data input), clock unit 54 may automatically generate additional clock pulses at data paths 60A and 60B even though no actual change in the data occurs. FIG. 23 further shows that when a change does occur at the transmit data input, and the clock signal at data paths 60A and 60B is high (e.g., a logical one) clock unit 54 may cause the automatic periodic clock signal at data paths 60A and 60B to be high as well.

Figure 24:
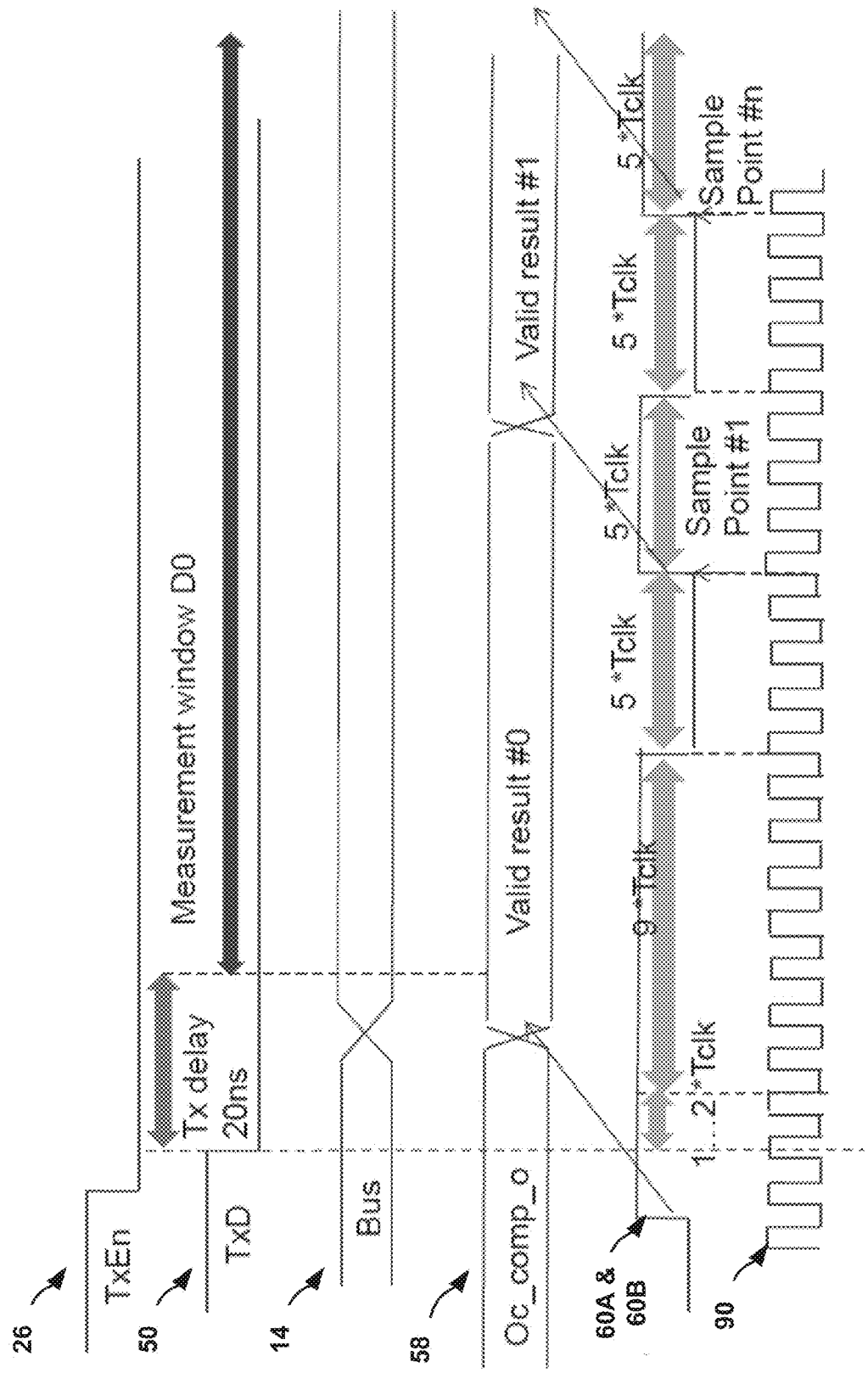
Figure 25:
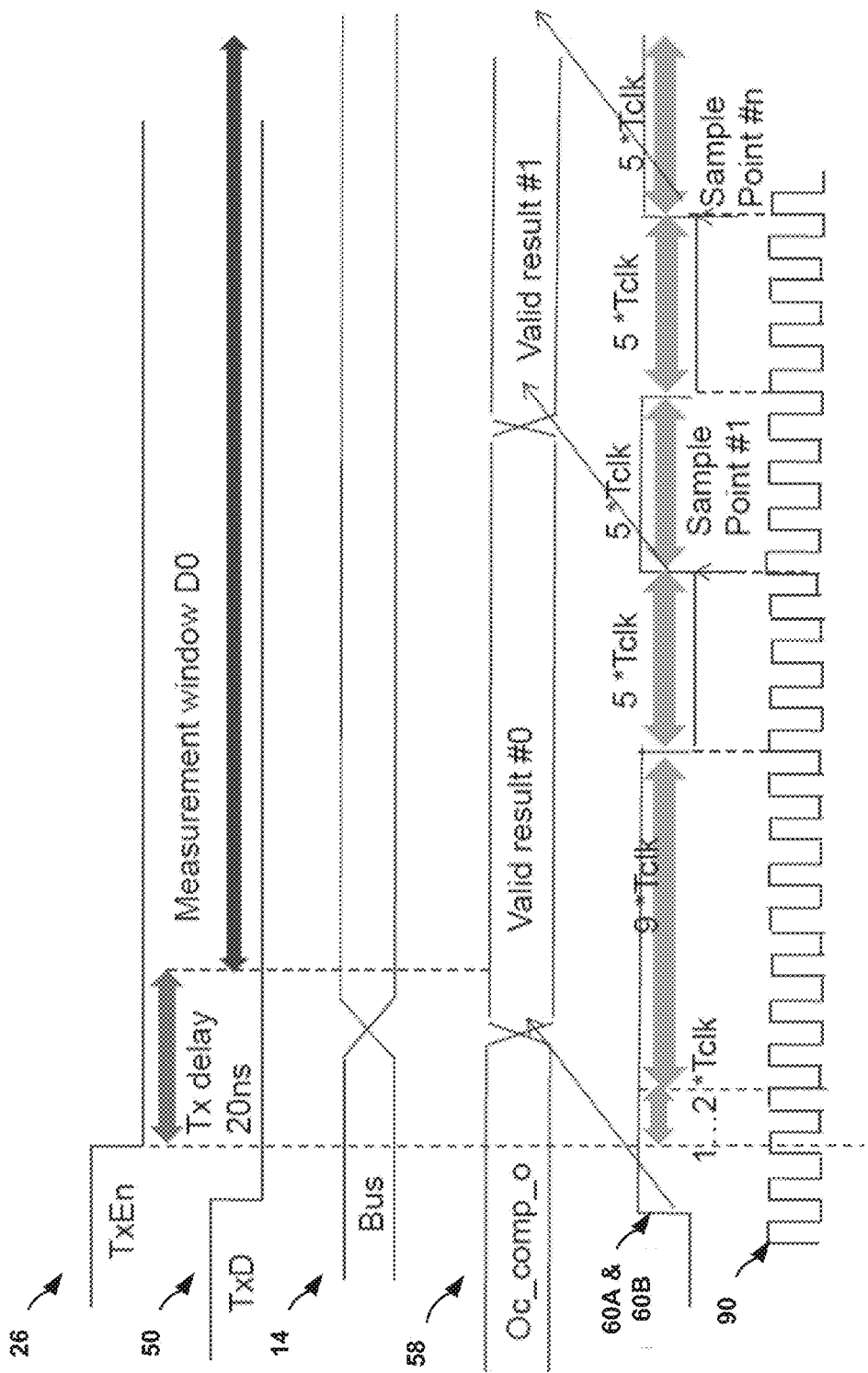

FIGS. 24 and 25 illustrate that OC handler unit 38 may be triggered by a change in the data at the transmit data input (e.g., data path 50), irrespective of the timing of the other data received from communication controller unit 22 over data path 26. For instance, communication controller unit 22 may transmit a transmit enable signal to driver unit 20 that indicates when the data at the transmit data input is valid and ready for transmission. Driver unit 20 may refrain from transmitting across bus 14 until the transmit enable line is logical low. FIG. 24 illustrates that when the transmit enable signal at data path 26 is asserted prior to the change in the data, OC handler unit 38 may perform over-current detection and handling functions. FIG. 25 illustrates that when the transmit enable signal at data path 26 is asserted low subsequent to the change in the data, OC handler unit 28 may still perform over-current detection and handling functions.

The techniques described herein may be implemented in hardware, firmware, or any combination thereof. The hardware may, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable storage medium comprising instructions that, when executed, cause a processor to perform one or more of the techniques described above.

A computer-readable storage medium may form part of a computer program product, which may include packaging materials. A computer-readable storage medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors. ASICs, field programmable logic arrays (FPGAs), or other equivalent integrated or discrete logic circuitry. Accordingly, the term "processor." as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various examples have been described. These and other examples are within the scope of the following claims.

What is claimed is:

1. An electrical circuit for driving a bus, comprising:
at least one branch coupled to at least one signal line at a termination of the bus;
a transmit data input configured to receive data, from a processor, that the electrical circuit drives across the bus;
a current detection unit coupled to the at least one branch, wherein the current detection unit is configured to detect a current through the at least one branch; and
an over-current determination unit coupled to both the current detection unit and the transmit data input, wherein the over-current determination unit is configured to:
detect a change of the data at the transmit data input; and
after delaying for at a predetermined amount of time subsequent to the change of the data at the transmit data input, determine an over-current condition at the at least one branch based on the current through the at least one branch and a value of the data at the transmit data input, wherein the predetermined amount of time is greater than or equal to a time duration of a single bit associated with the data at the transmit data input.

2. The electrical circuit of claim 1, further comprising:
an H-bridge circuit comprising a plurality of branches coupled to at the at least one signal line of the bus at the termination of the bus, wherein the at least one branch is one of the plurality of branches.

3. The electrical circuit of claim 1,
wherein the change of the data at the transmit data input is a first change, and
wherein the over-current determination unit is further configured to determine the over-current condition prior to a second change of the data at the transmit data input.

4. The electrical circuit of claim 1,
wherein the at least one branch comprises a resistor and a switch, and
wherein the current detection unit is configured to detect the current through the resistor based on a voltage across the resistor.

5. The electrical circuit of claim 1, further comprising:
a shutdown unit coupled to the over-current determination unit, the transmit data input, and the at least one branch, wherein the shutdown unit is configured to validate the over-current condition determined by the over-current determination unit based at least in part on the value of the data at the transmit data input.

6. The electrical circuit of claim 5,
wherein the shutdown unit is further configured to control the at least one branch in response to validating the over-current condition based at least in part on the value of the data at the transmit data input.

7. A method comprising:
detecting a current through at least one branch of a driver unit coupled to a bus for driving at least one signal line of the bus;
detecting a change in data at a transmit data input of the driver unit, wherein the transmit data input is configured to receive the data from a processor;
after delaying for a predetermined amount of time subsequent to the change of the data at the transmit data input, determining a value of the data at the transmit data input, wherein the predetermined amount of time is greater than or equal to a time duration of a single bit associated with the data at the transmit data input; and
determining an over-current condition at the at least one branch based at least in part on the current through the at least one branch and the value of the data.

8. The method of claim 7,
wherein the change is a first change, and
wherein the over-current condition is determined after the predetermined amount of time and prior to detecting a second change in the data.

9. The method of claim 7, wherein the at least one branch is one of a plurality of branches of an H-bridge circuit, the method further comprising:
determining a voltage across a resistor of the at least one branch; and
detecting the current through the at least one branch based at least in part on the voltage.

10. The method of claim 7, wherein the over-current condition is a first over-current condition, the method further comprising:
detecting a second over-current condition at a branch of the driver unit other than the at least one branch; and
validating the first over-current condition based at least in part on the value of the data and the second over-current condition.

11. The method of claim 10, further comprising:
controlling a switch of the at least one branch in response to validating the overcurrent condition.

12. A device comprising:
means for detecting a current through at least one branch of a driver unit coupled to a bus for driving at least one signal line of the bus;
means for detecting a change in data at a transmit data input of the driver unit, wherein the transmit data input is configured to receive the data from a processor;
means for determining a value of the data at the transmit data input after delaying for at least a predetermined amount of time subsequent to the change of the data at the transmit data input, wherein the predetermined amount of time is greater than or equal to a time duration of a single bit associated with the data at the transmit data input; and
means for determining an over-current condition at the at least one branch based at least in part on the current through the at least one branch and the value of the data.

13. The device of claim 12, wherein the at least one branch is one of a plurality of branches of an H-bridge circuit, the device further comprising:
means for determining a voltage across a resistor of the at least one branch; and
means for detecting the current through the at least one branch based at least in part on the voltage.

14. The device of claim 12, further comprising:
means for validating the over-current condition based at least in part on the value of the data; and
means for controlling a switch of the at least one branch in response to validating the over-current condition.

15. The electrical circuit of claim 1, further comprising a transceiver unit configured to generate, based on the data at the transmit data input, a differential voltage signal at the termination of the bus.

16. The electrical circuit of claim 15, wherein the data comprises a binary data stream.

\* \* \* \* \*